(12) United States Patent
Manolakos et al.

(10) Patent No.: US 11,506,743 B2
(45) Date of Patent: Nov. 22, 2022

(54) INTERACTION BETWEEN POSITIONING REFERENCE SIGNAL PROCESSING CAPABILITIES FOR THE UU AND SIDELINK INTERFACES

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/683,312

(22) Filed: Feb. 28, 2022

(65) Prior Publication Data

US 2022/0317232 A1    Oct. 6, 2022

(30) Foreign Application Priority Data

Mar. 31, 2021   (GR) .............................. 20210100222

(51) Int. Cl.
*H04W 4/00* (2018.01)
*G01S 5/00* (2006.01)
(Continued)

(52) U.S. Cl.
CPC .......... *G01S 5/0072* (2013.01); *H04L 5/0051* (2013.01); *H04W 72/02* (2013.01);
(Continued)

(58) Field of Classification Search
CPC . G01S 1/20; G01S 5/0236; G01S 5/10; H04L 27/0012; H04L 27/2601;
(Continued)

(56) References Cited

U.S. PATENT DOCUMENTS 10,218,471 B1 * 2/2019 Kumar ................... H04L 5/0053
2016/0095092 A1 * 3/2016 Khoryaev ............. H04W 8/005
370/329
(Continued)

FOREIGN PATENT DOCUMENTS

WO      2020251318 A1    12/2020

OTHER PUBLICATIONS

International Search Report and Written Opinion—PCT/US2022/070902—ISA/EPO—dated Jun. 14, 2022.
(Continued)

*Primary Examiner* — David Q Nguyen
(74) *Attorney, Agent, or Firm* — Thien T. Nguyen

(57) ABSTRACT

Disclosed are techniques for wireless communication. In an aspect, a user equipment (UE) engages in a downlink positioning session, a sidelink positioning session, or both with one or more first network entities, and transmits at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

30 Claims, 16 Drawing Sheets

(51) Int. Cl.
  *H04L 5/00*  (2006.01)
  *H04W 72/04*  (2009.01)
  *H04W 72/02*  (2009.01)
  *H04W 92/18*  (2009.01)
(52) U.S. Cl.
  CPC ..... *H04W 72/048* (2013.01); *H04W 72/0453* (2013.01); *H04W 92/18* (2013.01)
(58) Field of Classification Search
  CPC .. H04L 5/0007; H04L 5/0053; H04W 64/003; H04W 72/082; H04W 4/02; H04W 92/18; H04W 4/70; H04W 76/14; H04W 64/00
  USPC .......................................... 370/328, 329, 330
  See application file for complete search history.

(56) References Cited

U.S. PATENT DOCUMENTS

2020/0351815 A1\* 11/2020 Kim ...................... H04W 56/00
2022/0053411 A1\* 2/2022 Bao .......................... G01S 1/68

OTHER PUBLICATIONS

Moderator (Intel Corporation), et al., "Feature Lead Summary for NR Positioning Maintenance AI 7.2.8", R1-2006996, 3GPP TSG RAN WG1 Meeting #102-E, 3rd Generation Partnership Project, Mobile Competence Centre, 350, Route Des Lucioles, F-06921 Sophia-Antipolis Cedex, France, vol. RAN WG1. No. e-Meeting, Aug. 17, 2020-Aug. 28, 2020, Aug. 22, 2020, XP051921226, 22 Pages.

\* cited by examiner

INTERACTION BETWEEN POSITIONING REFERENCE SIGNAL PROCESSING CAPABILITIES FOR THE UU AND SIDELINK INTERFACES

CROSS-REFERENCE TO RELATED APPLICATIONS

The present Application for Patent claims priority to Greek Patent Application No. 20210100222, entitled "INTERACTION BETWEEN POSITIONING REFERENCE SIGNAL PROCESSING CAPABILITIES FOR THE UU AND SIDELINK INTERFACES," filed Mar. 31, 2021, which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes engaging in a downlink positioning session, a sidelink positioning session, or both with one or more first network entities; and transmitting at least one positioning capability report to a second network entity, the at least one positioning capability report including one or more parameters indicating joint downlink and sidelink capabilities of the UE to process both downlink positioning reference signals (DL-PRS) and sidelink positioning reference signals (SL-PRS).

In an aspect, a user equipment (UE) includes a memory; a communication interface; and at least one processor communicatively coupled to the memory and the communication interface, the at least one processor configured to: engage in a downlink positioning session, a sidelink positioning session, or both with one or more first network entities; and cause the communication interface to transmit at least one positioning capability report to a second network entity, the at least one positioning capability report including one or more parameters indicating joint downlink and sidelink capabilities of the UE to process both downlink positioning reference signals (DL-PRS) and sidelink positioning reference signals (SL-PRS).

In an aspect, a user equipment (UE) includes means for engaging in a downlink positioning session, a sidelink positioning session, or both with one or more first network entities; and means for transmitting at least one positioning capability report to a second network entity, the at least one positioning capability report including one or more parameters indicating joint downlink and sidelink capabilities of the UE to process both downlink positioning reference signals (DL-PRS) and sidelink positioning reference signals (SL-PRS).

In an aspect, a non-transitory computer-readable medium stores computer-executable instructions that, when executed by a user equipment (UE), cause the UE to: engage in a downlink positioning session, a sidelink positioning session, or both with one or more first network entities; and transmit at least one positioning capability report to a second network entity, the at least one positioning capability report including one or more parameters indicating joint downlink and sidelink capabilities of the UE to process both downlink positioning reference signals (DL-PRS) and sidelink positioning reference signals (SL-PRS).

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
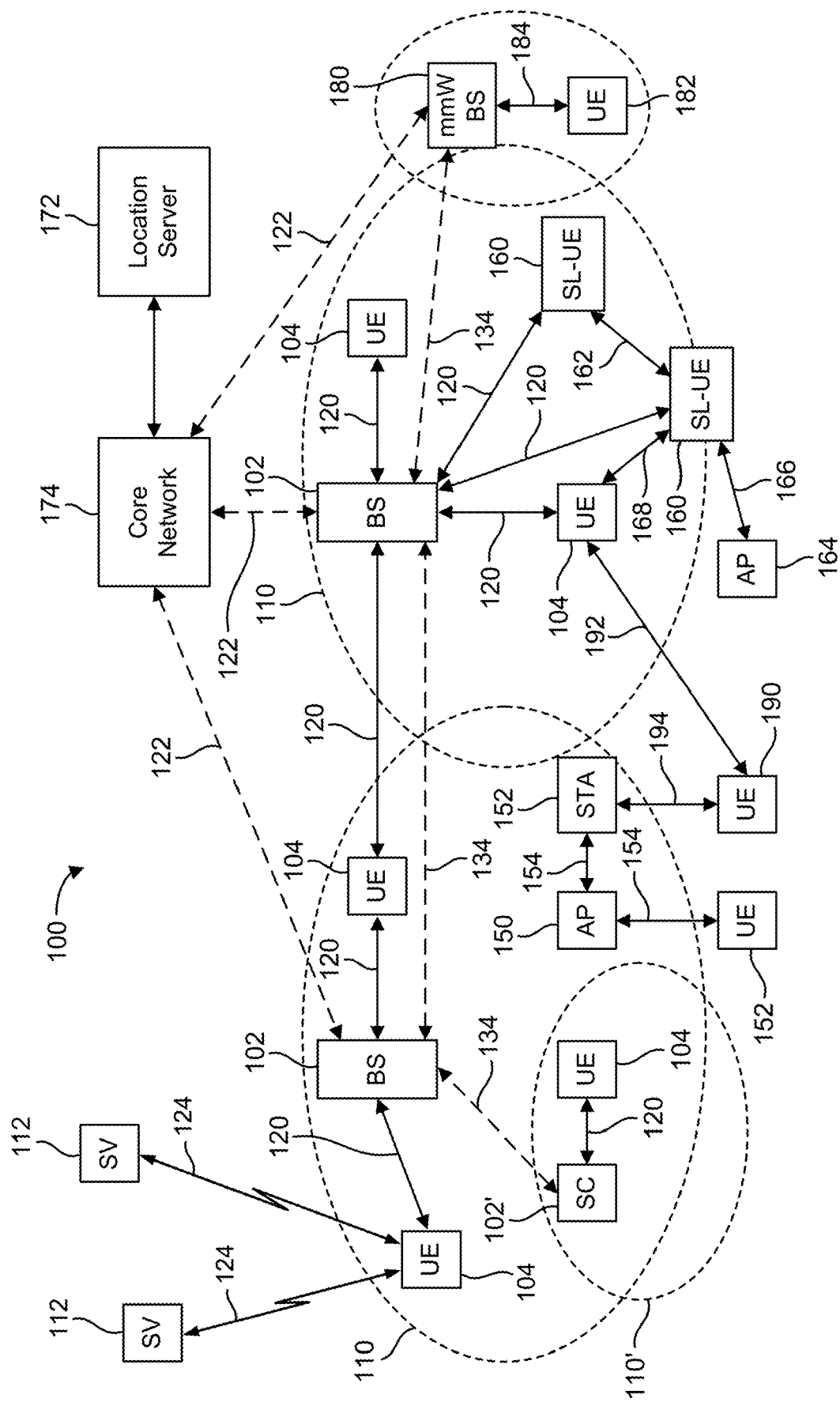
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multipleoutput (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 174 (e.g., an evolved packet core (EPC) or 5G core (5GC)) through backhaul links 122, and through the core network 174 to one or more location servers 172 (e.g., a location management function (LMF) or a secure user plane location (SUPL) location platform (SLP)). The location server(s) 172 may be part of core network 174 or may be external to core network 174. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction.

Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). mmW frequency bands generally include the FR2, FR3, and FR4 frequency ranges. As such, the terms "mmW" and "FR2" or "FR3" or "FR4" may generally be used interchangeably.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 (e.g., using the Uu interface). V-UEs 160 may also communicate directly with each other over a wireless sidelink 162, with a roadside access point 164 (also referred to as a "roadside unit") over a wireless sidelink 166, or with UEs 104 over a wireless sidelink 168. A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS GSA band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more roadside access points 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more roadside access points 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards roadside access points 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on. As another example, the D2D P2P links 192 and 194 may be sidelinks, as described above with reference to sidelinks 162, 166, and 168.

Figure 2A:
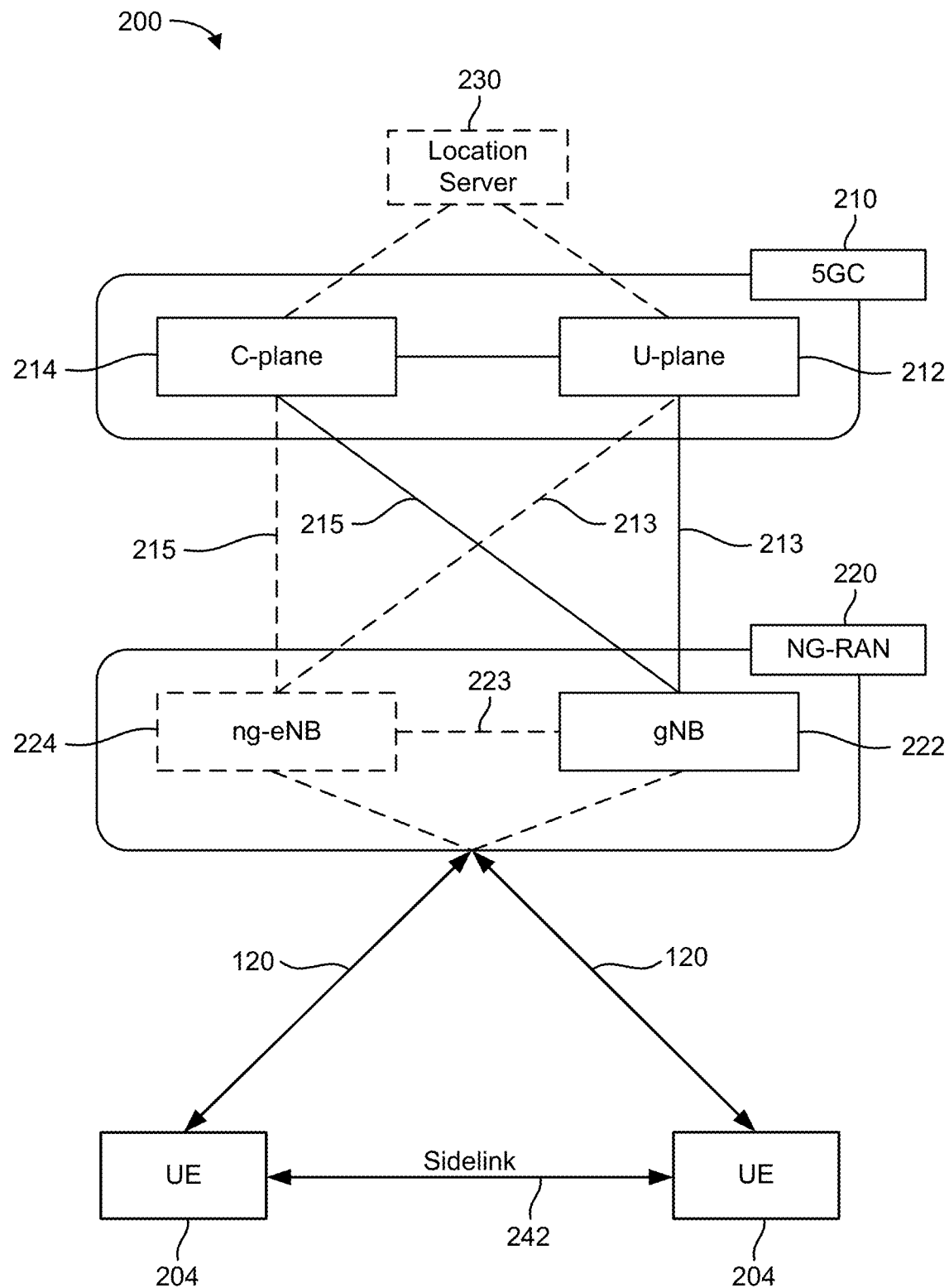
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either (or both) gNB 222 or ng-eNB 224 may communicate with UEs 204 (e.g., any of the UEs described herein). In an aspect, two or more UEs 204 may communicate with each other over a wireless sidelink 242, which may correspond to wireless sidelink 162 in FIG. 1.

Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
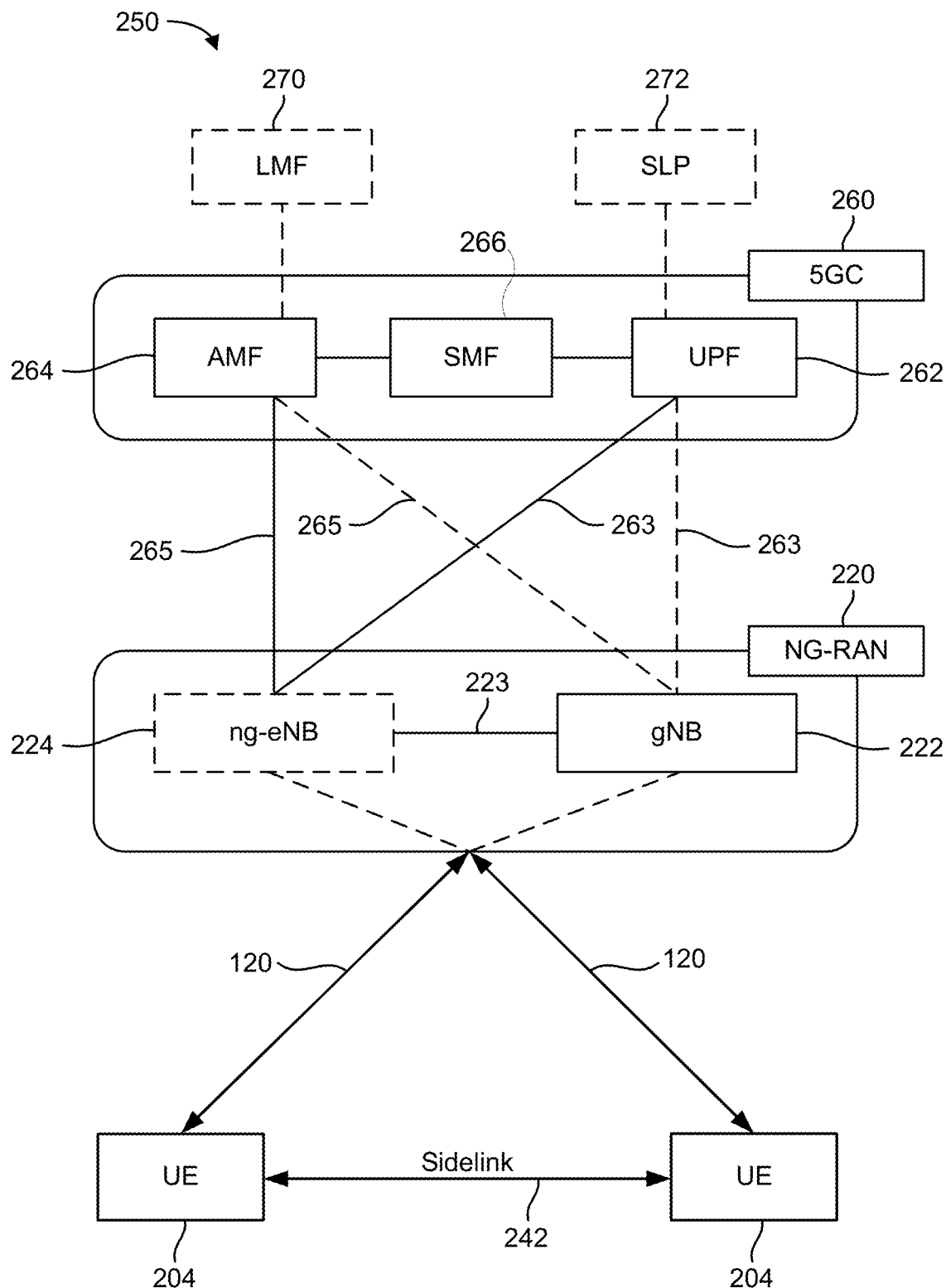

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. The base stations of the NG-RAN 220 communicate with the AMF 264 over the N2 interface and with the UPF 262 over the N3 interface. Either (or both) gNB 222 or ng-eNB 224 may communicate with UEs 204 (e.g., any of the UEs described herein). In an aspect, two or more UEs 204 may communicate with each other over a sidelink 242, which may correspond to sidelink 162 in FIG. 1.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 which acts as a location server 230, transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270 but, whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g. using protocols intended to carry voice and/or data like the transmission control protocol (TCP) and/or IP).

Figure 3A:
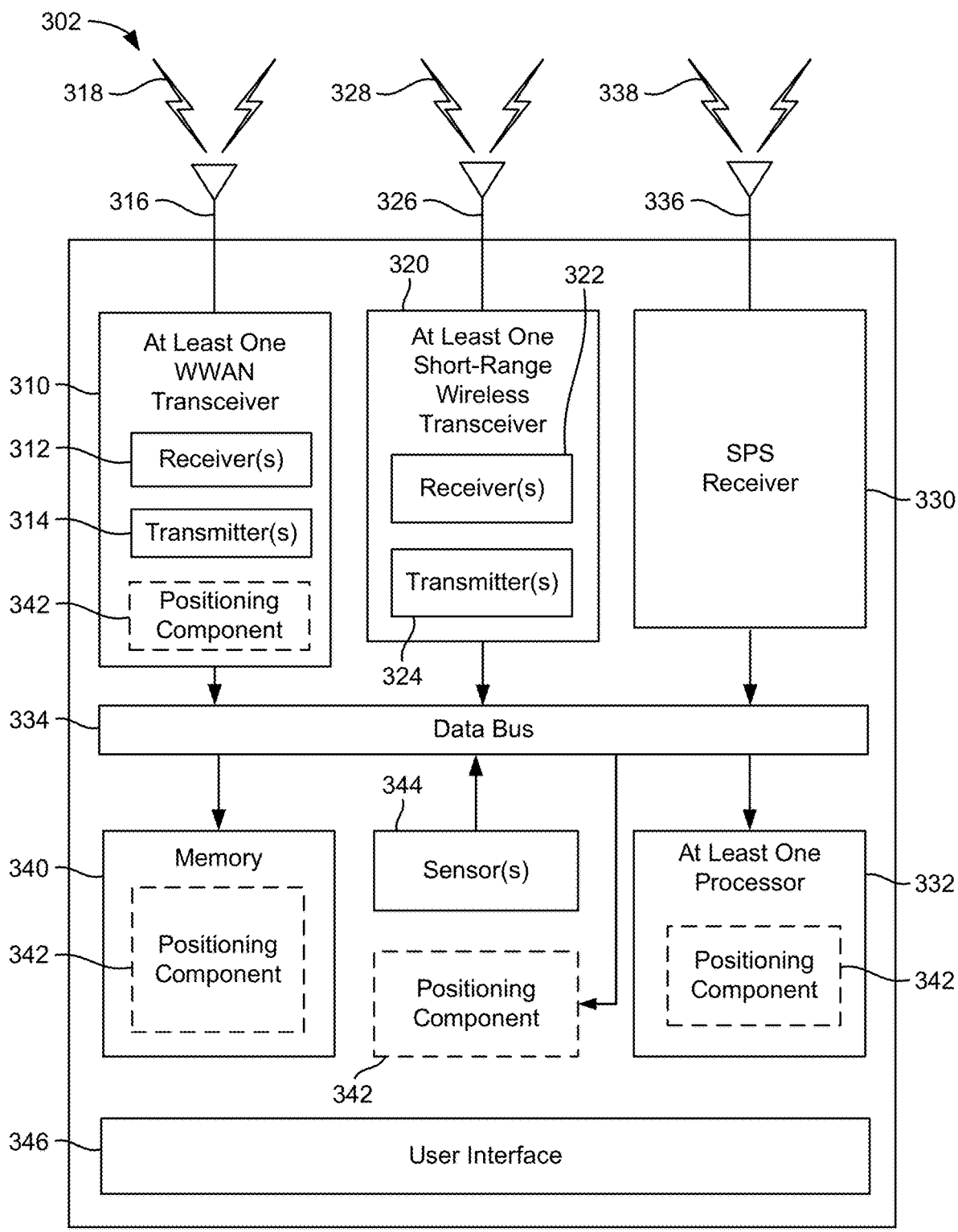
FIGS. 3A to 3C are simplified block diagrams of several sample aspects of components that may be employed in a user equipment (UE), a base station, and a network entity, respectively, and configured to support communications as taught herein.
Figure 3B:
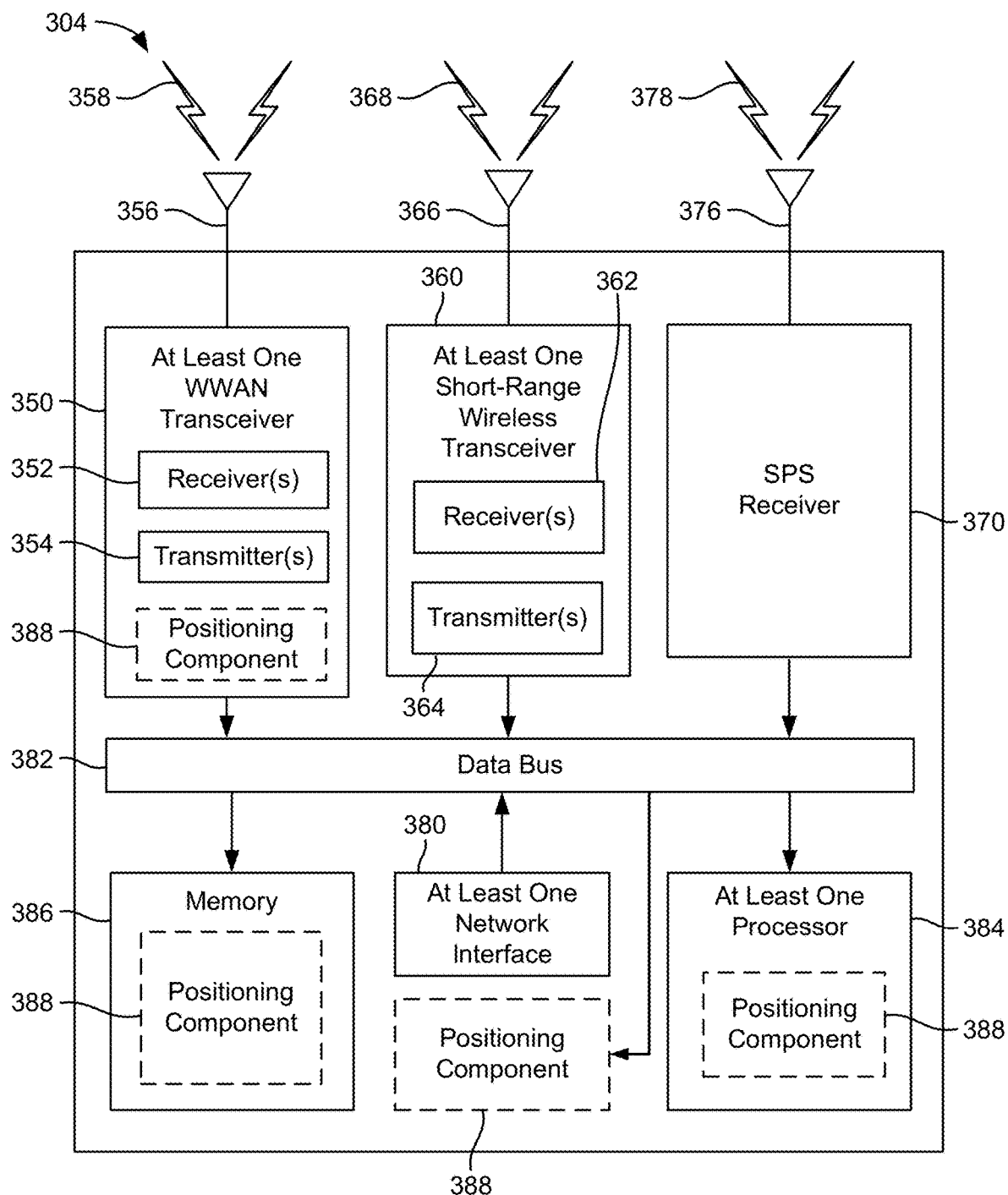
Figure 3C:
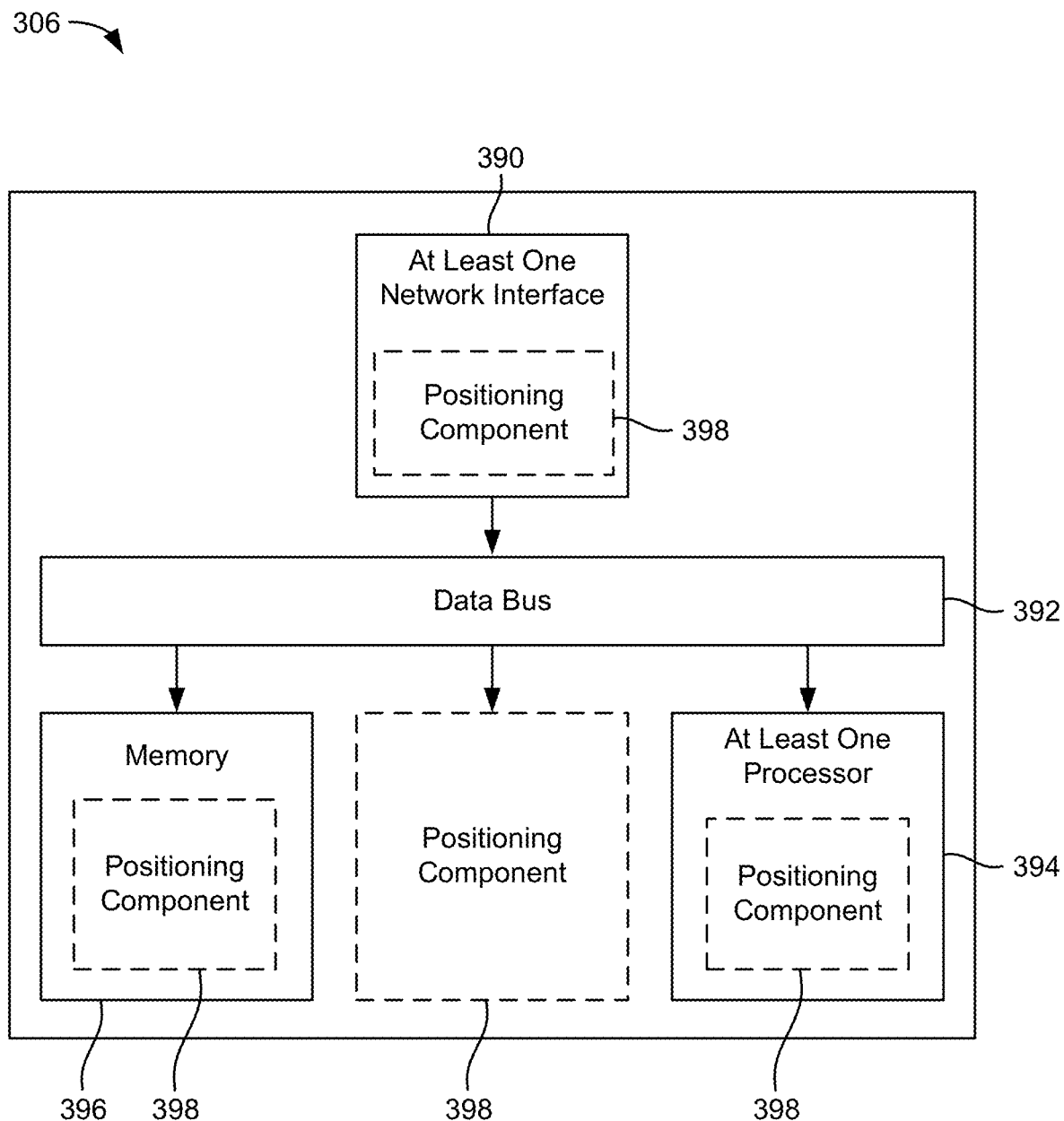

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include at least one wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also each include, at least in some cases, at least one short-range wireless transceiver 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interface 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

In an aspect, the at least one WWAN transceiver 310 and/or the at least one short-range wireless transceiver 320 may form a (wireless) communication interface of the UE 302. Similarly, the at least one WWAN transceiver 350, the at least one short-range wireless transceiver 360, and/or the at least one network interface 380 may form a (wireless) communication interface of the base station 304. Likewise, the at least one network interface) 390 may form a (wireless) communication interface of the network entity 306. The various wireless transceivers (e.g., transceivers 310, 320, 350, and 360) and wired transceivers (e.g., network interfaces 380 and 390) may generally be characterized as at least one transceiver, or alternatively, as at least one communication interface. As such, whether a particular transceiver or communication interface relates to a wired or wireless transceiver or communication interface, respectively, may be inferred from the type of communication performed (e.g., a backhaul communication between network devices or servers will generally relate to signaling via at least one wired transceiver).

The UE 302, the base station 304, and the network entity 306 also include other components that may be used in conjunction with the operations as disclosed herein. The UE 302, the base station 304, and the network entity 306 include at least one processor 332, 384, and 394, respectively, for providing functionality relating to, for example, wireless positioning, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, at least one general purpose processor, multi-core processor, central processing unit (CPU), ASIC, digital signal processor (DSP), field programmable gate array (FPGA), other programmable logic device or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning components 342, 388, and 398 may be external to the processors 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the at least one WWAN transceiver 310, the memory component 340, the at least one processor 332, or any combination thereof, or may be a standalone component. FIG. 3B illustrates possible locations of the positioning component 388, which may be part of the at least one WWAN transceiver 350, the memory component 386, the at least one processor 384, or any combination thereof, or may be a standalone component. FIG. 3C illustrates possible locations of the positioning component 398, which may be part of the at least one network interface 390, the memory component 396, the at least one processor 394, or any combination thereof, or may be a standalone component.

The UE 302 may include one or more sensors 344 coupled to the at least one processor 332 to provide means for sensing or detecting movement and/or orientation information that is independent of motion data derived from signals received by the at least one WWAN transceiver 310, the at least one short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the at least one processor 384 in more detail, in the downlink, IP packets from the network entity 306 may be provided to the at least one processor 384. The at least one processor 384 may implement functionality for an RRC layer, a packet data convergence protocol (PDCP) layer, a radio link control (RLC) layer, and a medium access control (MAC) layer. The at least one processor 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the at least one processor 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the at least one processor 332, which implements Layer-3 (L3) and Layer-2 (L2) functionality.

In the uplink, the at least one processor 332 provides demultiplexing between transport and logical channels, packet reassembly, deciphering, header decompression, and control signal processing to recover IP packets from the core network. The at least one processor 332 is also responsible for error detection.

Similar to the functionality described in connection with the downlink transmission by the base station 304, the at least one processor 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the at least one processor 384.

In the uplink, the at least one processor 384 provides demultiplexing between transport and logical channels, packet reassembly, deciphering, header decompression, control signal processing to recover IP packets from the UE 302. IP packets from the at least one processor 384 may be provided to the core network. The at least one processor 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. In an aspect, the data buses 334, 382, and 392 may form, or be part of, the communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memory components 340, 386, and 396, the positioning components 342, 388, and 398, etc.

Figure 4:
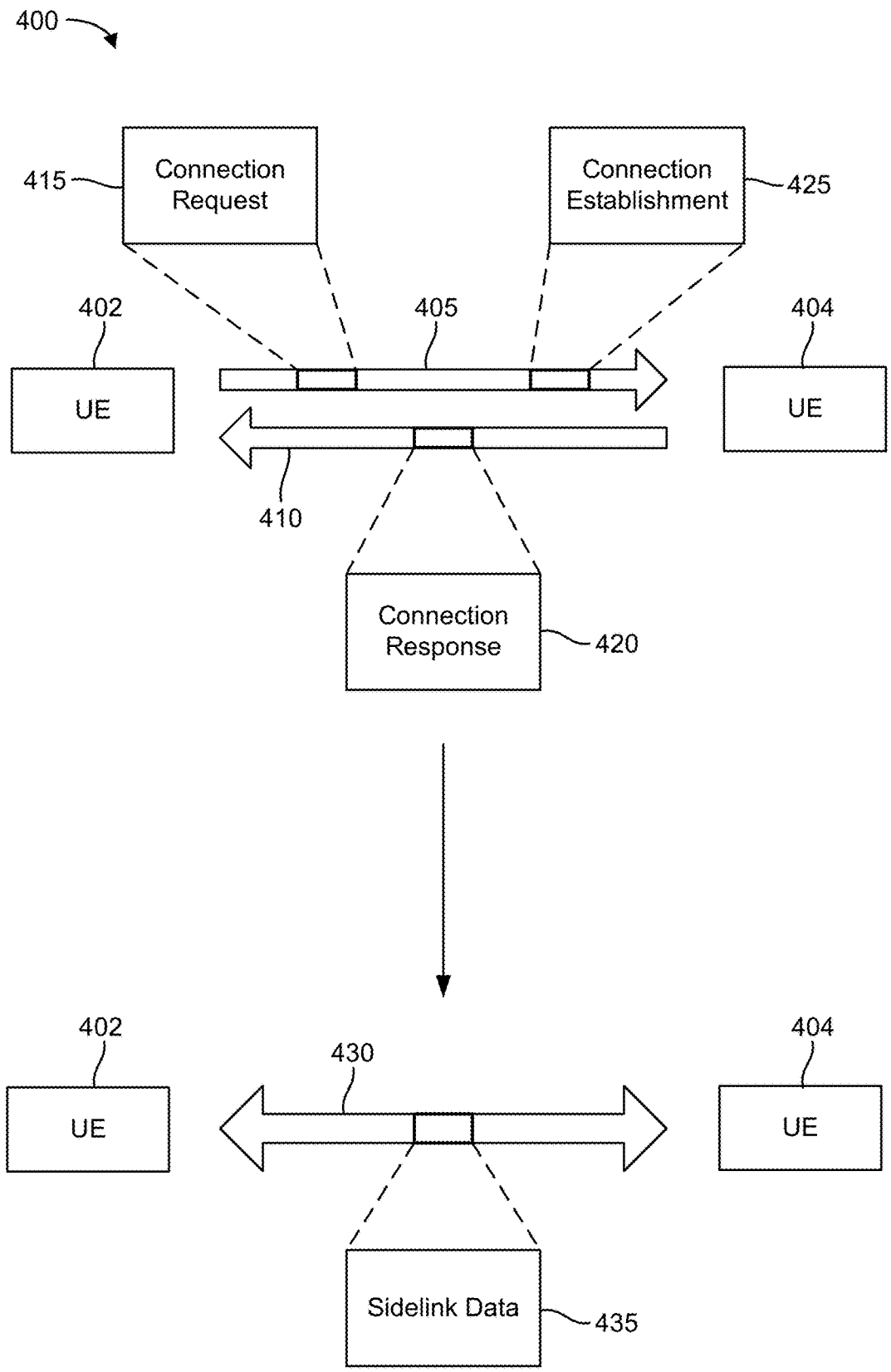
FIG. 4 illustrates an example of a wireless communications system that supports unicast sidelink establishment, according to aspects of the disclosure.

FIG. 4 illustrates an example of a wireless communications system 400 that supports wireless unicast sidelink establishment, according to aspects of the disclosure. In some examples, wireless communications system 400 may implement aspects of wireless communications systems 100, 200, and 250. Wireless communications system 400 may include a first UE 402 and a second UE 404, which may be examples of any of the UEs described herein. As specific examples, UEs 402 and 404 may correspond to V-UEs 160 in FIG. 1, UE 190 and UE 104 in FIG. 1 connected over D2D P2P link 192, or UEs 204 in FIGS. 2A and 2B.

In the example of FIG. 4, the UE 402 may attempt to establish a unicast connection over a sidelink with the UE 404, which may be a V2X sidelink between the UE 402 and UE 404. As specific examples, the established sidelink connection may correspond to sidelinks 162 and/or 168 in FIG. 1 or sidelink 242 in FIGS. 2A and 2B. The sidelink connection may be established in an omni-directional frequency range (e.g., FR1) and/or a mmW frequency range (e.g., FR2). In some cases, the UE 402 may be referred to as an initiating UE that initiates the sidelink connection procedure, and the UE 404 may be referred to as a target UE that is targeted for the sidelink connection procedure by the initiating UE.

For establishing the unicast connection, access stratum (AS) (a functional layer in the UMTS and LTE protocol stacks between the RAN and the UE that is responsible for transporting data over wireless links and managing radio resources, and which is part of Layer 2) parameters may be configured and negotiated between the UE 402 and UE 404. For example, a transmission and reception capability matching may be negotiated between the UE 402 and UE 404. Each UE may have different capabilities (e.g., transmission and reception, 64 quadrature amplitude modulation (QAM), transmission diversity, carrier aggregation (CA), supported communications frequency band(s), etc.). In some cases, different services may be supported at the upper layers of corresponding protocol stacks for UE 402 and UE 404. Additionally, a security association may be established between UE 402 and UE 404 for the unicast connection.

Unicast traffic may benefit from security protection at a link level (e.g., integrity protection). Security requirements may differ for different wireless communications systems. For example, V2X and Uu systems may have different security requirements (e.g., Uu security does not include confidentiality protection). Additionally, IP configurations (e.g., IP versions, addresses, etc.) may be negotiated for the unicast connection between UE 402 and UE 404.

In some cases, UE 404 may create a service announcement (e.g., a service capability message) to transmit over a cellular network (e.g., cV2X) to assist the sidelink connection establishment. Conventionally, UE 402 may identify and locate candidates for sidelink communications based on a basic service message (BSM) broadcasted unencrypted by nearby UEs (e.g., UE 404). The BSM may include location information, security and identity information, and vehicle information (e.g., speed, maneuver, size, etc.) for the corresponding UE. However, for different wireless communications systems (e.g., D2D or V2X communications), a discovery channel may not be configured so that UE 402 is able to detect the BSM(s). Accordingly, the service announcement transmitted by UE 404 and other nearby UEs (e.g., a discovery signal) may be an upper layer signal and broadcasted (e.g., in an NR sidelink broadcast). In some cases, the UE 404 may include one or more parameters for itself in the service announcement, including connection parameters and/or capabilities it possesses. The UE 402 may then monitor for and receive the broadcasted service announcement to identify potential UEs for corresponding sidelink connections. In some cases, the UE 402 may identify the potential UEs based on the capabilities each UE indicates in their respective service announcements.

The service announcement may include information to assist the UE 402 (e.g., or any initiating UE) to identify the UE transmitting the service announcement (UE 404 in the example of FIG. 4). For example, the service announcement may include channel information where direct communication requests may be sent. In some cases, the channel information may be RAT-specific (e.g., specific to LTE or NR) and may include a resource pool within which UE 402 transmits the communication request. Additionally, the service announcement may include a specific destination address for the UE (e.g., a Layer 2 destination address) if the destination address is different from the current address (e.g., the address of the streaming provider or UE transmitting the service announcement). The service announcement may also include a network or transport layer for the UE 402 to transmit a communication request on. For example, the network layer (also referred to as "Layer 4" or "L3") or the transport layer (also referred to as "Layer 4" or "L4") may indicate a port number of an application for the UE transmitting the service announcement. In some cases, no IP addressing may be needed if the signaling (e.g., PC5 signaling) carries a protocol (e.g., a real-time transport protocol (RTP)) directly or gives a locally-generated random protocol. Additionally, the service announcement may include a type of protocol for credential establishment and QoS-related parameters.

After identifying a potential sidelink connection target (UE 404 in the example of FIG. 4), the initiating UE (UE 402 in the example of FIG. 4) may transmit a connection request 415 to the identified target UE 404. In some cases, the connection request 415 may be a first RRC message transmitted by the UE 402 to request a unicast connection with the UE 404 (e.g., an "RRCDirectConnectionSetupRequest" message). For example, the unicast connection may utilize the PC5 interface for the sidelink, and the connection request 415 may be an RRC connection setup request message. Additionally, the UE 402 may use a sidelink signaling radio bearer 405 to transport the connection request 415.

After receiving the connection request 415, the UE 404 may determine whether to accept or reject the connection request 415. The UE 404 may base this determination on a transmission/reception capability, an ability to accommodate the unicast connection over the sidelink, a particular service indicated for the unicast connection, the contents to be transmitted over the unicast connection, or a combination thereof. For example, if the UE 402 wants to use a first RAT to transmit or receive data, but the UE 404 does not support the first RAT, then the UE 404 may reject the connection request 415. Additionally or alternatively, the UE 404 may reject the connection request 415 based on being unable to accommodate the unicast connection over the sidelink due to limited radio resources, a scheduling issue, etc. Accordingly, the UE 404 may transmit an indication of whether the request is accepted or rejected in a connection response 420. Similar to the UE 402 and the connection request 415, the UE 404 may use a sidelink signaling radio bearer 410 to transport the connection response 420. Additionally, the connection response 420 may be a second RRC message transmitted by the UE 404 in response to the connection request 415 (e.g., an "RRCDirectConnectionResponse" message).

In some cases, sidelink signaling radio bearers 405 and 410 may be the same sidelink signaling radio bearer or may be separate sidelink signaling radio bearers. Accordingly, a radio link control (RLC) layer acknowledged mode (AM) may be used for sidelink signaling radio bearers 405 and 410. A UE that supports the unicast connection may listen on a logical channel associated with the sidelink signaling radio bearers. In some cases, the AS layer (i.e., Layer 2) may pass information directly through RRC signaling (e.g., control plane) instead of a V2X layer (e.g., data plane).

If the connection response 420 indicates that the UE 404 accepted the connection request 415, the UE 402 may then transmit a connection establishment 425 message on the sidelink signaling radio bearer 405 to indicate that the unicast connection setup is complete. In some cases, the connection establishment 425 may be a third RRC message (e.g., an "RRCDirectConnectionSetupComplete" message). Each of the connection request 415, the connection response 420, and the connection establishment 425 may use a basic capability when being transported from one UE to the other UE to enable each UE to be able to receive and decode the corresponding transmission (e.g., the RRC messages).

Additionally, identifiers may be used for each of the connection request 415, the connection response 420, and the connection establishment 425. For example, the identifiers may indicate which UE 402/304 is transmitting which message and/or for which UE 402/304 the message is intended. For physical (PHY) layer channels, the RRC signaling and any subsequent data transmissions may use the same identifier (e.g., Layer 2 IDs). However, for logical channels, the identifiers may be separate for the RRC signaling and for the data transmissions. For example, on the logical channels, the RRC signaling and the data transmissions may be treated differently and have different acknowledgement (ACK) feedback messaging. In some cases, for the RRC messaging, a physical layer ACK may be used for ensuring the corresponding messages are transmitted and received properly.

One or more information elements may be included in the connection request 415 and/or the connection response 420 for UE 402 and/or UE 404, respectively, to enable negotiation of corresponding AS layer parameters for the unicast connection. For example, the UE 402 and/or UE 404 may include packet data convergence protocol (PDCP) parameters in a corresponding unicast connection setup message to set a PDCP context for the unicast connection. In some cases, the PDCP context may indicate whether or not PDCP duplication is utilized for the unicast connection. Additionally, the UE 402 and/or UE 404 may include RLC parameters when establishing the unicast connection to set an RLC context for the unicast connection. For example, the RLC context may indicate whether an AM (e.g., a reordering timer (t-reordering) is used) or an unacknowledged mode (UM) is used for the RLC layer of the unicast communications.

Additionally, the UE 402 and/or UE 404 may include medium access control (MAC) parameters to set a MAC context for the unicast connection. In some cases, the MAC context may enable resource selection algorithms, a hybrid automatic repeat request (HARQ) feedback scheme (e.g., ACK or negative ACK (NACK) feedback), parameters for the HARQ feedback scheme, carrier aggregation, or a combination thereof for the unicast connection. Additionally, the UE 402 and/or UE 404 may include PHY layer parameters when establishing the unicast connection to set a PHY layer context for the unicast connection. For example, the PHY layer context may indicate a transmission format (unless transmission profiles are included for each UE 402/304) and a radio resource configuration (e.g., bandwidth part (BWP), numerology, etc.) for the unicast connection. These information elements may be supported for different frequency range configurations (e.g., FR1 and FR2).

In some cases, a security context may also be set for the unicast connection (e.g., after the connection establishment 425 message is transmitted). Before a security association (e.g., security context) is established between the UE 402 and UE 404, the sidelink signaling radio bearers 405 and 410 may not be protected. After a security association is established, the sidelink signaling radio bearers 405 and 410 may be protected. Accordingly, the security context may enable secure data transmissions over the unicast connection and the sidelink signaling radio bearers 405 and 410. Additionally, IP layer parameters (e.g., link-local IPv4 or IPv6 addresses) may also be negotiated. In some cases, the IP layer parameters may be negotiated by an upper layer control protocol running after RRC signaling is established (e.g., the unicast connection is established). As noted above, the UE 404 may base its decision on whether to accept or reject the connection request 415 on a particular service indicated for the unicast connection and/or the contents to be transmitted over the unicast connection (e.g., upper layer information). The particular service and/or contents may be also indicated by an upper layer control protocol running after RRC signaling is established.

After the unicast connection is established, the UE 402 and UE 404 may communicate using the unicast connection over a sidelink 430, where sidelink data 435 is transmitted between the two UEs 402 and 404. The sidelink 430 may correspond to sidelinks 162 and/or 168 in FIG. 1 and/or sidelink 242 in FIGS. 2A and 2B. In some cases, the sidelink data 435 may include RRC messages transmitted between the two UEs 402 and 404. To maintain this unicast connection on sidelink 430, UE 402 and/or UE 404 may transmit a keep alive message (e.g., "RRCDirectLinkAlive" message, a fourth RRC message, etc.). In some cases, the keep alive message may be triggered periodically or on-demand (e.g., event-triggered). Accordingly, the triggering and transmission of the keep alive message may be invoked by UE 402 or by both UE 402 and UE 404. Additionally or alternatively, a MAC control element (CE) (e.g., defined over sidelink 430) may be used to monitor the status of the unicast connection on sidelink 430 and maintain the connection. When the unicast connection is no longer needed (e.g., UE 402 travels far enough away from UE 404), either UE 402 and/or UE 404 may start a release procedure to drop the unicast connection over sidelink 430. Accordingly, subsequent RRC messages may not be transmitted between UE 402 and UE 404 on the unicast connection.

Figure 5A:
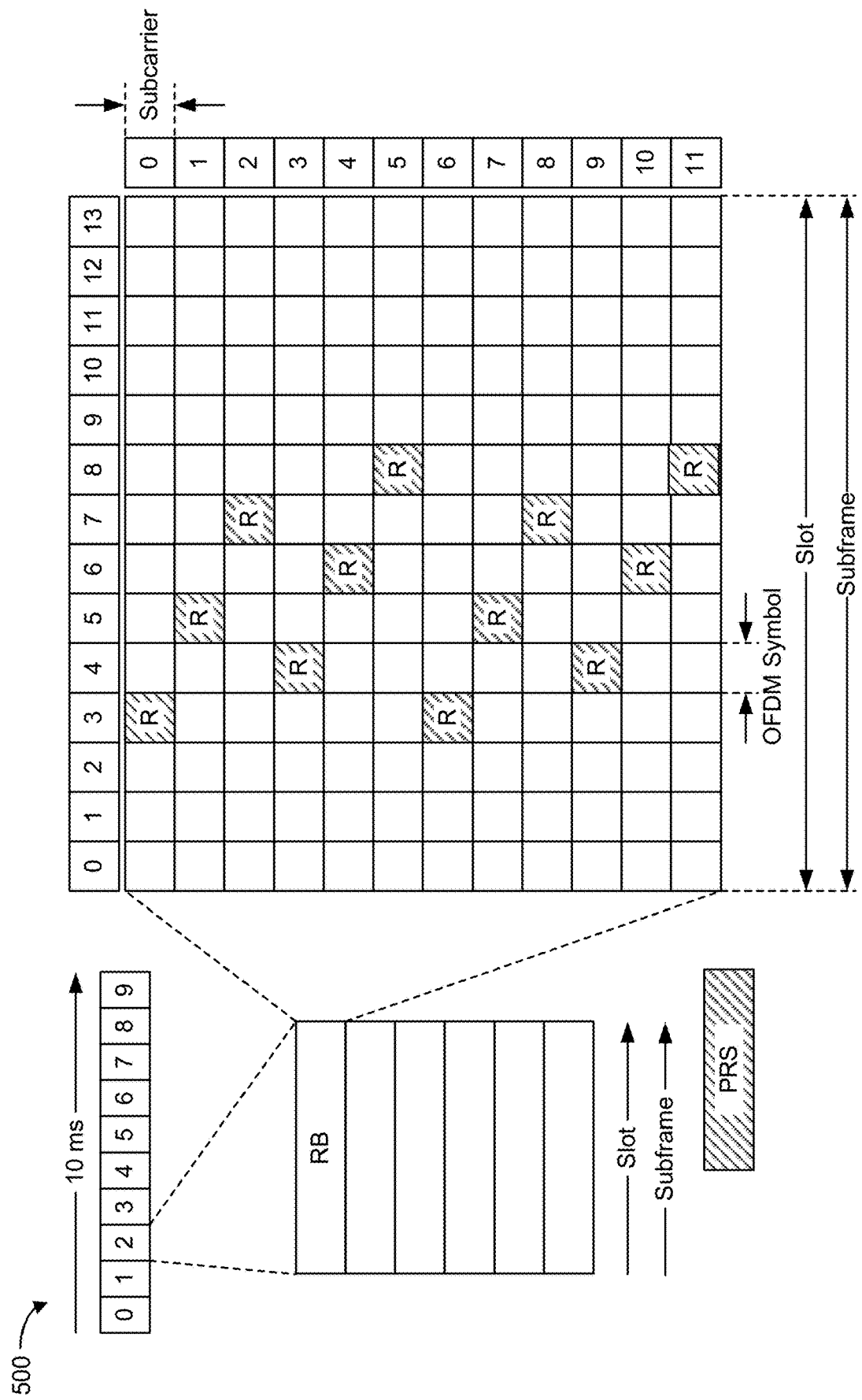
FIGS. 5A to 5D are diagrams illustrating example frame structures and channels within the frame structures, according to aspects of the disclosure.
Figure 5B:
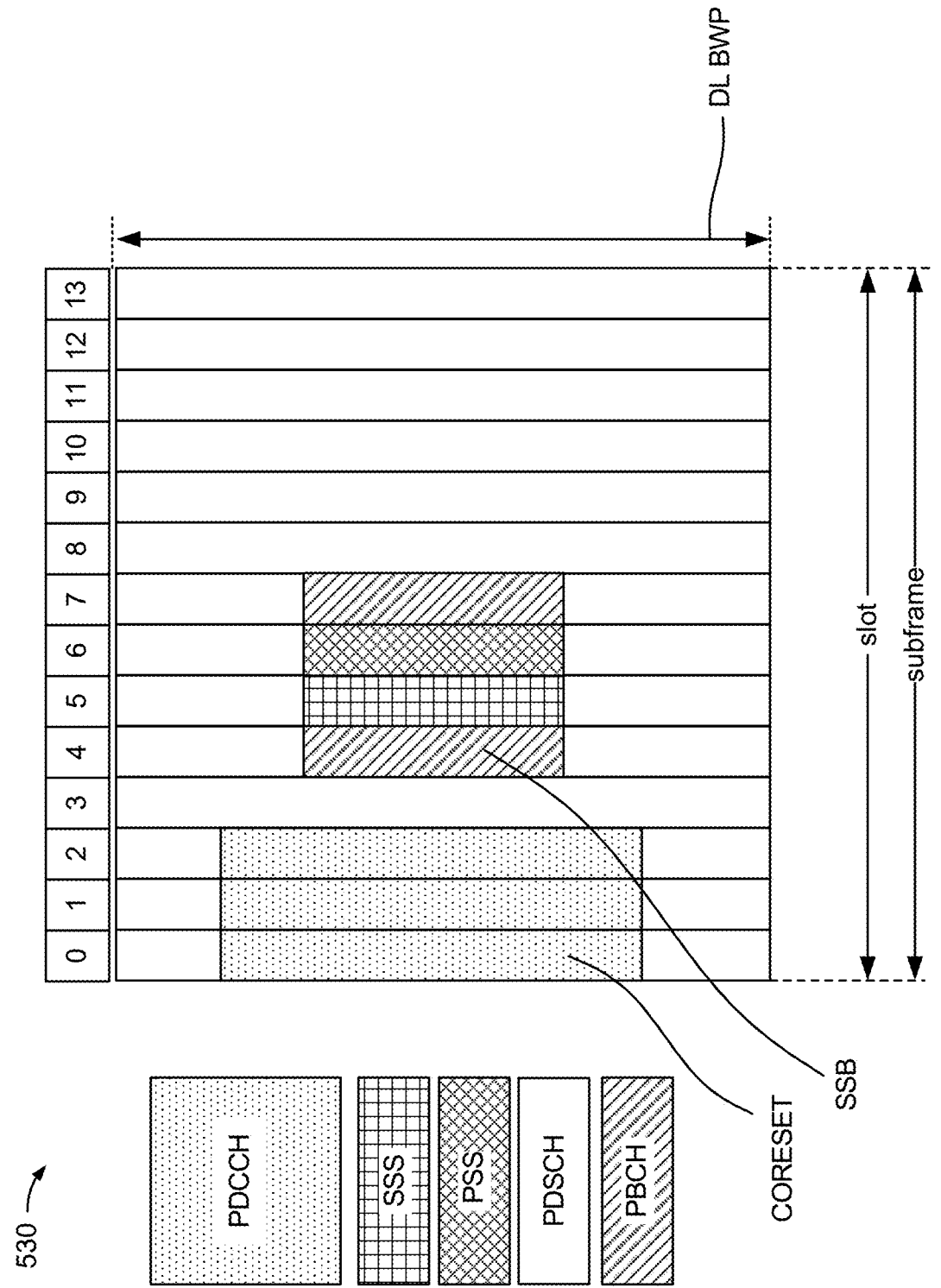
Figure 5C:
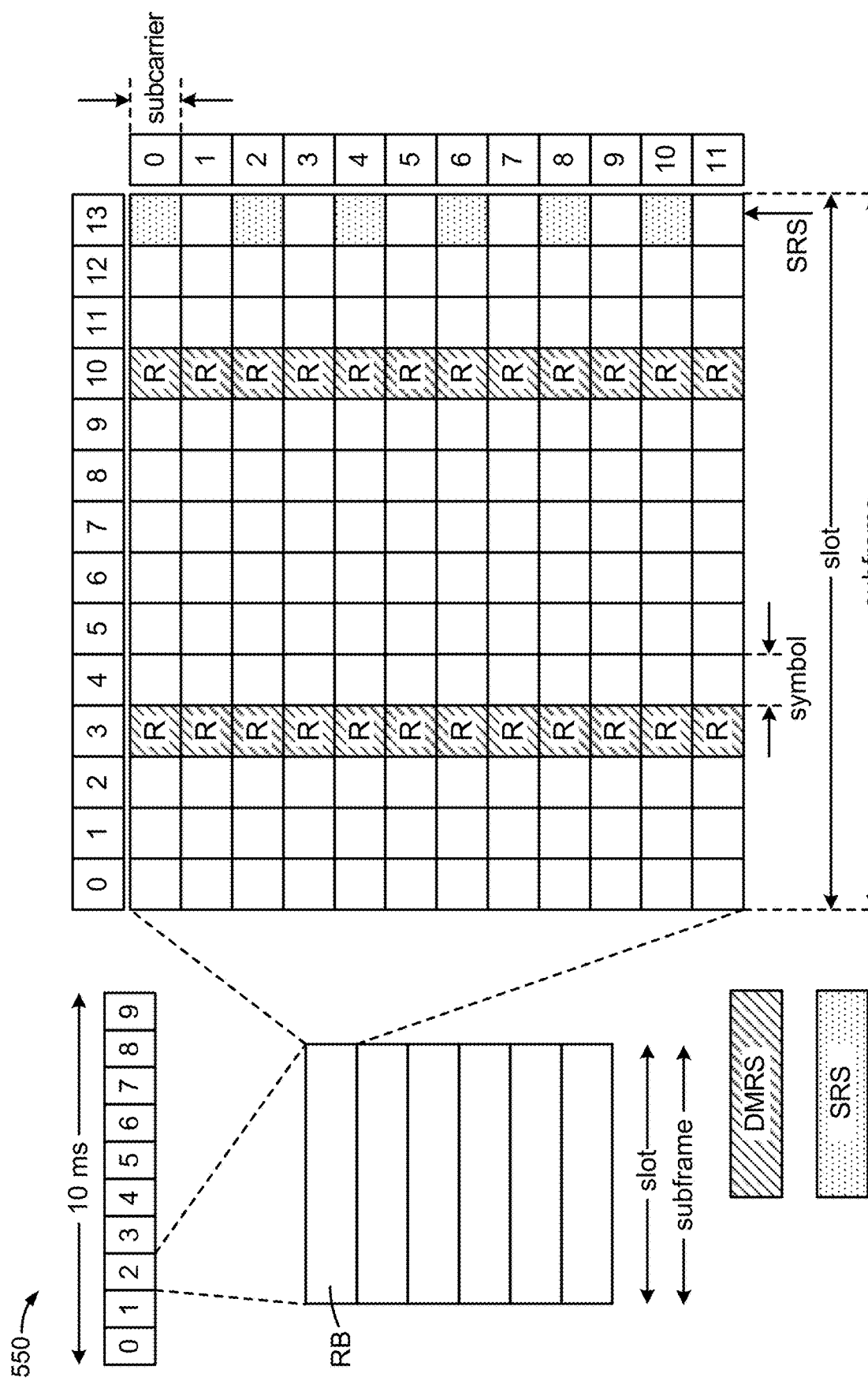
Figure 5D:
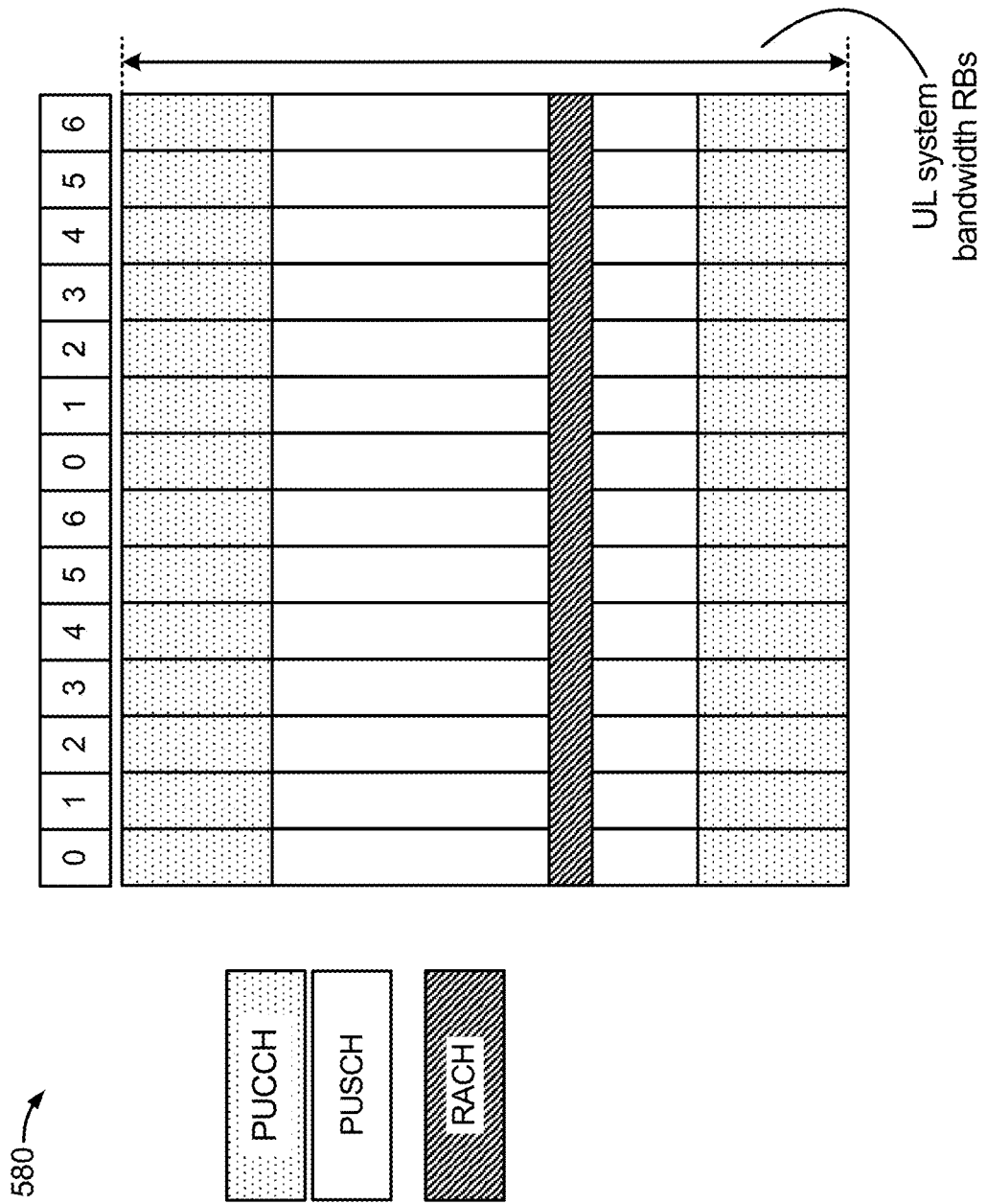

Various frame structures may be used to support downlink and uplink transmissions between network nodes (e.g., base stations and UEs). FIG. 5A is a diagram 500 illustrating an example of a downlink frame structure, according to aspects of the disclosure. FIG. 5B is a diagram 530 illustrating an example of channels within the downlink frame structure, according to aspects of the disclosure. FIG. 5C is a diagram 550 illustrating an example of an uplink frame structure, according to aspects of the disclosure. FIG. 5D is a diagram 580 illustrating an example of channels within an uplink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies ($\mu$), for example, subcarrier spacings of 15 kHz ($\mu$=0), 30 kHz ($\mu$=1), 60 kHz ($\mu$=2), 120 kHz ($\mu$=3), and 240 kHz ($\mu$=4) or greater may be available. In each subcarrier spacing, there are 14 symbols per slot. For 15 kHz SCS ($\mu$=0), there is one slot per subframe, 10 slots per frame, the slot duration is 1 millisecond (ms), the symbol duration is 66.7 microseconds ($\mu$s), and the maximum nominal system bandwidth (in MHz) with a 4K FFT size is 50. For 30 kHz SCS ($\mu$=1), there are two slots per subframe, 20 slots per frame, the slot duration is 0.5 ms, the symbol duration is 33.3 $\mu$s, and the maximum nominal system bandwidth (in MHz) with a 4K FFT size is 100. For 60 kHz SCS ($\mu$=2), there are four slots per subframe, 40 slots per frame, the slot duration is 0.25 ms, the symbol duration is 16.7 $\mu$s, and the maximum nominal system bandwidth (in MHz) with a 4K FFT size is 200. For 120 kHz SCS ($\mu$=3), there are eight slots per subframe, 80 slots per frame, the slot duration is 0.125 ms, the symbol duration is 8.33 $\mu$s, and the maximum nominal system bandwidth (in MHz) with a 4K FFT size is 400. For 240 kHz SCS ($\mu=4$), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIGS. 5A to 5D, a numerology of 15 kHz is used. Thus, in the time domain, a 10 ms frame is divided into 10 equally sized subframes of 1 ms each, and each subframe includes one time slot. In FIGS. 5A to 5D, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 5A to 5D, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 5A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 5A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3}; 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 5B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

As illustrated in FIG. 5C, some of the REs (labeled "R") carry DMRS for channel estimation at the receiver (e.g., a base station, another UE, etc.). A UE may additionally transmit SRS in, for example, the last symbol of a slot. The SRS may have a comb structure, and a UE may transmit SRS on one of the combs. In the example of FIG. 5C, the illustrated SRS is comb-2 over one symbol. The SRS may be used by a base station to obtain the channel state information (CSI) for each UE. CSI describes how an RF signal propagates from the UE to the base station and represents the combined effect of scattering, fading, and power decay with distance. The system uses the SRS for resource scheduling, link adaptation, massive MIMO, beam management, etc.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: 101; 2-symbol comb-2: 10, 11; 4-symbol comb-2: 10, 1, 0, 11; 4-symbol comb-4: {0, 2, 1, 3}; 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

A collection of resource elements that are used for transmission of SRS is referred to as an "SRS resource," and may be identified by the parameter "SRS-ResourceId." The collection of resource elements can span multiple PRBs in the frequency domain and N (e.g., one or more) consecutive symbol(s) within a slot in the time domain. In a given OFDM symbol, an SRS resource occupies consecutive PRBs. An "SRS resource set" is a set of SRS resources used for the transmission of SRS signals, and is identified by an SRS resource set ID ("SRS-ResourceSetId").

Generally, a UE transmits SRS to enable the receiving base station (either the serving base station or a neighboring base station) to measure the channel quality between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through MAC control element (CE) or DCI).

FIG. 5D illustrates an example of various channels within an uplink slot of a frame, according to aspects of the disclosure. A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," an uplink positioning reference signal (e.g., an SRS-for-positioning, PTRS) may be referred to as an "UL-PRS," and a sidelink positioning reference signal may be referred to as an "SL-PRS." In addition, for signals that may be transmitted in uplink, downlink, and sidelink directions (e.g., DMRS, PT-RS, etc.), the signals may be prepended with "UL," "DL," or "SL," respectively, to distinguish the direction. For example, "UL-DMRS" may be differentiated from "SL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

In addition to the downlink-based, uplink-based, and downlink-and-uplink-based positioning methods, NR supports various sidelink positioning techniques. For example, a sidelink round-trip-time (SL-RTT) positioning procedure has been introduced for use between UEs that is similar to an RTT positioning procedure between a base station and a UE. In an SL-RTT positioning procedure, the initiator UE (e.g., the target UE to be located) transmits a sidelink reference signal (e.g., an SL-PRS) on sidelink resources allocated by the initiator UE's serving base station or negotiated with other sidelink-capable UEs. On receiving the sidelink reference signal, a responder UE (e.g., another sidelink-capable UE) transmits a response sidelink reference signal (e.g., an SL-PRS) that includes a measurement of the difference between the reception time of the sidelink reference signal and the transmission time of the response sidelink reference signal (referred to as the reception-to-transmission (Rx-Tx) time difference measurement of the responder).

Upon receiving the response sidelink reference signal, the initiator UE (or other positioning entity) can calculate the RTT between the initiator UE and the responder UE based on the received Rx-Tx time difference measurement and a measurement of the difference between the transmission time of the first sidelink reference signal and the reception time of the response sidelink reference signal (referred to as the transmission-to-reception (Tx-Rx) time difference measurement of the initiator UE). The initiator UE (or other positioning entity) uses the RTT and the speed of light to estimate the distance between the initiator UE and the responder UE. If one or both of the initiator UE and the responder UE are capable of beamforming, the angle between the UEs may also be able to be determined, further refining the relative location of the initiator UE with respect to the responder UE. In addition, if the responder UE provides its geographic location in the response sidelink reference signal, the initiator UE (or other positioning entity) may be able to determine an absolute geographic location of the initiator UE, as opposed to a relative location of the initiator UE with respect to the responder UE.

Figure 6:
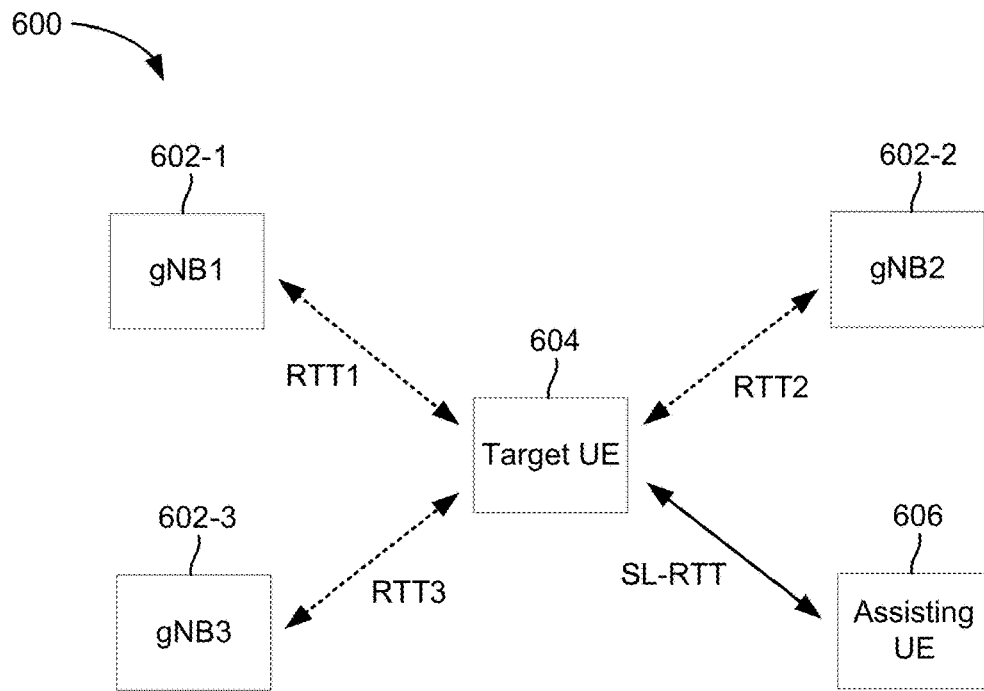
FIG. 6 illustrates an example scenario in which a UE with a known location can be used to improve the location estimate of a target UE, according to aspects of the disclosure.

There are various scenarios of interest and use cases for sidelink positioning techniques, as illustrated and described below with reference to FIGS. 6 to 8. FIG. 6 illustrates an example scenario 600 in which a UE with a known location can be used to improve the location estimate of a target UE 604, according to aspects of the disclosure. In the example of FIG. 6, a target UE 604 is performing a multi-cell RTT positioning procedure with three base stations 602, specifically, a first RTT positioning procedure (labeled "RTT1") with a first base station 602-1 (labeled "gNB1"), a second RTT positioning procedure (labeled "RTT2") with a second base station 602-2 (labeled "gNB2"), and a third RTT positioning procedure (labeled "RTT3") with a third base station 602-3 (labeled "gNB3"). As noted above, the air interface between a UE (e.g., target UE 604) and a base station (e.g., base stations 602) is referred to as the "Uu" interface. As such, in the context of sidelink positioning, a positioning procedure between a UE and a base station may be referred to as a Uu positioning procedure. Thus, for example, the multi-RTT positioning procedure illustrated in FIG. 6 may be referred to as a Uu multi-RTT positioning procedure.

In the example of FIG. 6, the target UE 604 can also perform an SL-RTT positioning procedure (labeled "SL-RTT") with an assisting UE 606 having a known location (e.g., via GPS, cellular positioning technique, etc.). Because the assisting UE 606 has a known location, it can act as an additional anchor point for the multi-RTT positioning procedure between the target UE 604 and the base stations 602. That is, the assisting UE 606 can provide an additional RTT estimate with respect to a known geographic location, thereby improving the final location estimate.

Note that while FIG. 6 illustrates three base stations 602 and one assisting UE 606, there may be more or fewer base stations 602 and more assisting UEs 606.

Figure 7:
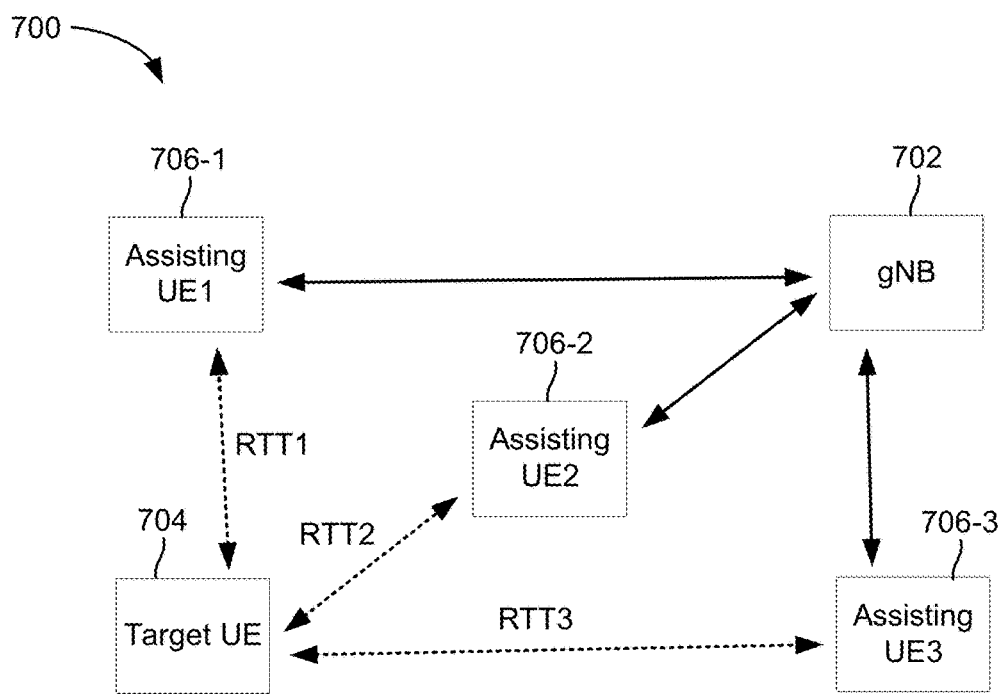
FIG. 7 illustrates an example scenario in which the location of a target UE without cellular connectivity is determined with the assistance of a plurality of UEs with cellular connectivity, according to aspects of the disclosure.

FIG. 7 illustrates an example scenario 700 in which the location of a target UE 704 without cellular connectivity is determined with the assistance of a plurality of UEs with cellular connectivity, according to aspects of the disclosure. In the example of FIG. 7, the target UE 704 is performing an SL-RTT positioning procedure with each of three assisting UEs 706, specifically, a first SL-RTT positioning procedure (labeled "RTT1") with a first assisting UE 706-1, a second SL-RTT positioning procedure (labeled "RTT2") with a second assisting UE 706-2, and a third SL-RTT positioning procedure (labeled "RTT3") with a third assisting UE 706-3. Each of the assisting UEs 706 may be connected to one or more base stations 702 (labeled "gNB") and have a known location. Based on the determined RTTs between the target UE 704 and the assisting UEs 706 and the known locations of the assisting UEs 706, the location of the target UE 704 can be estimated using known RTT techniques.

Figure 8:
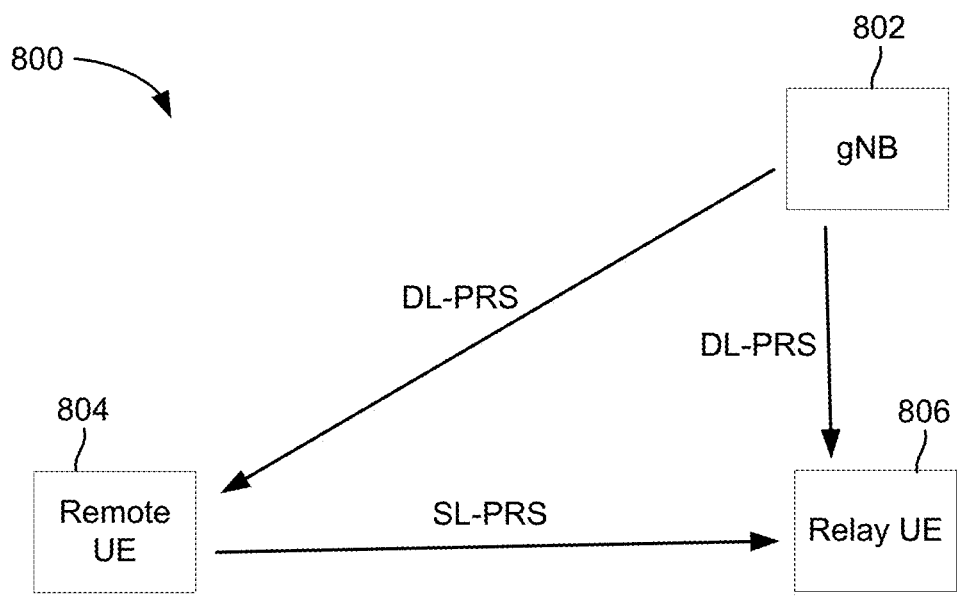
FIG. 8 illustrates an example scenario in which a relay UE assists in the positioning of a remote UE, according to aspects of the disclosure.

FIG. 8 illustrates an example scenario 800 in which a relay UE 806 assists in the positioning of a remote UE, according to aspects of the disclosure. In the example of FIG. 8, the remote UE 804 is not able to transmit UL-PRS to the base station 802 (e.g., due to the transmit power of the remote UE being to low to be heard by the base station 802). In this case, the relay 806, having a known location, can participate in the positioning estimation of the remote UE 804.

Sidelink communication takes place in transmission or reception resource pools. In the frequency domain, the minimum resource allocation unit is a sub-channel (e.g., a collection of consecutive PRBs in the frequency domain). In the time domain, resource allocation is in one slot intervals. However, some slots are not available for sidelink, and some slots contain feedback resources. In addition, sidelink can be (pre)configured to occupy fewer than the 14 symbols of a slot.

Sidelink resources are configured at the RRC layer. The RRC configuration can be by pre-configuration (e.g., pre-loaded on the UE) or configuration (e.g., from a serving base station).

Figure 9:
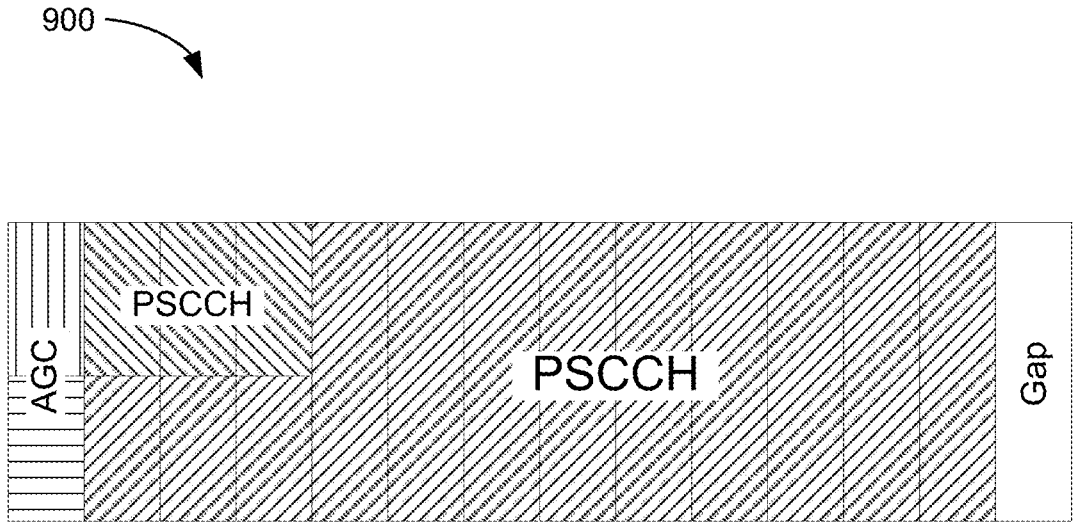
FIG. 9 is a diagram of an example slot structure without feedback resources, according to aspects of the disclosure.

FIG. 9 is a diagram 900 of an example slot structure without feedback resources, according to aspects of the disclosure. In the example of FIG. 9, time is represented horizontally and frequency is represented vertically. In the time domain, the length of each block is an OFDM symbol, and the 14 symbols make up a slot. In the frequency domain, the height of each block is a sub-channel. Currently, the (pre)configured sub-channel size can be selected from the set of {10, 15, 20, 25, 50, 75, 100} PRBs.

For a sidelink slot, the first symbol is a repetition of the preceding symbol and is used for automatic gain control (AGC) setting. This is illustrated in FIG. 9 by the vertical and horizontal hashing. As shown in FIG. 9, for sidelink, the physical sidelink control channel (PSCCH) and the physical sidelink shared channel (PSSCH) are transmitted in the same slot. Similar to the PDCCH, the PSCCH carries control information about sidelink resource allocation and descriptions about sidelink data transmitted to the UE. Likewise, similar to the PDSCH, the PSSCH carries user date for the UE. In the example of FIG. 9, the PSCCH occupies half the bandwidth of the sub-channel and only three symbols. Finally, a gap symbol is present after the PSSCH.

Another aspect of positioning is the configuration of resource pools for positioning (RP-Ps) that can be used for downlink and/or sidelink positioning purposes. The 12 symbols between the first symbol (for AGC) and the last symbol (the gap) form a resource pool for transmission and/or reception. An RP-P can be configured within a resource pool specifically for positioning purposes. Each RP-P includes an offset, periodicity, number of consecutive symbols within a slot (e.g., as few as one symbol), and/or the bandwidth within a component carrier (or the bandwidth across multiple component carriers). In addition, each RP-P can be associated with a zone or a distance from a reference location.

A base station (or a UE) can assign, to another UE, one or more resource configurations from the RP-Ps. Additionally or alternatively, a UE (e.g., a relay or a remote UE) can request one or more RP-P configurations, and it can include in the request one or more of the following: (1) its location information (or zone ID), (2) periodicity, (3) bandwidth, (4) offset, (5) number of symbols, and (6) whether a configuration with "low interference" is needed (which can be determined through an assigned QoS or priority).

A base station or a UE can configure/assign rate matching resources or RP-P for rate matching and/or muting to a sidelink UE such that when a collision exists between the assigned resources and another resource pool that contains data (PSSCH) and/or control (PSCCH), the sidelink UE is expected to rate match, mute, and/or puncture the data, DMRS, and/or CSI-RS within the colliding resources. This would enable orthogonalization between positioning and data transmissions for increased coverage of PRS signals.

Figure 10:
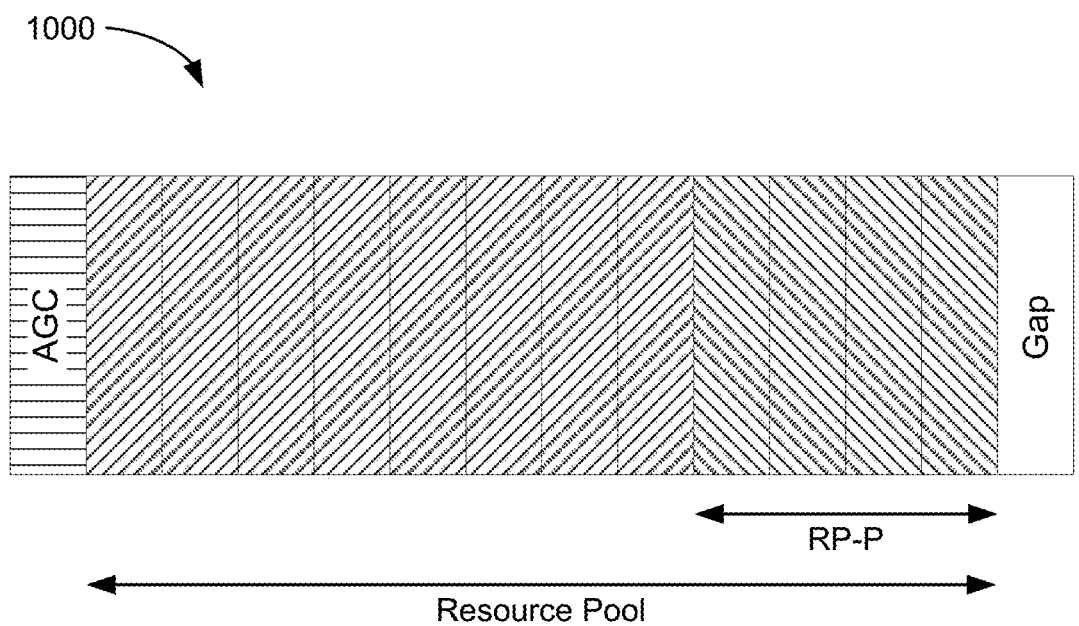
FIG. 10 is a diagram illustrating an example overlap between a resource pool and a resource pool for positioning, according to aspects of the disclosure.

FIG. 10 is a diagram 1000 illustrating an example overlap between a resource pool and a resource pool for positioning, according to aspects of the disclosure. In the example of FIG. 10, time is represented horizontally and frequency is represented vertically. In the time domain, the length of each block is an OFDM symbol, and the 14 symbols make up a slot. In the frequency domain, the height of each block is a sub-channel.

In the example of FIG. 10, the entire slot (except for the first and last symbols) can be a resource pool for transmission and/or reception. That is, any of the symbols other than the first and last can be allocated for transmission and/or reception. However, an RP-P for sidelink transmission/reception is allocated in the last four pre-gap symbols of the slot. As such, non-sidelink data, such as user data, CSI-RS, and control information, can only be transmitted in the first eight post-AGC symbols and not in the last four pre-gap symbols to prevent a collision with the configured RP-P. The non-sidelink data that would otherwise be transmitted in the last four pre-gap symbols can be punctured or muted, or the non-sidelink data that would normally span more than the eight post-AGC symbols can be rate matched to fit into the eight post-AGC symbols.

There are a number of DL-PRS processing capabilities that a UE may report (e.g., in an LPP Provide Capabilities message at the beginning of a positioning session). For example, the UE may report the maximum DL-PRS bandwidth (e.g., in MHz) that is supported by the UE. For FR1 bands, this may be selected from the set of {5, 10, 20, 40, 50, 80, 100}. For FR2 bands, this may be selected from the set of {50, 100, 200, 400}. Another parameter is the DL-PRS buffering capability of the UE, which may be either Type 1 or Type 2. Type 1 is sub-slot/symbol level buffering and Type 2 is slot level buffering.

Another capability parameter is the duration of DL-PRS symbols 'N' (e.g., in units of milliseconds (ms)) a UE can process every 'T' ms, assuming the maximum DL-PRS bandwidth (e.g., in MHz) supported by the UE. The value of 'T' may be selected from the set of {8, 16, 20, 30, 40, 80, 160, 320, 640, 1280} ms. The value of 'N' may be selected from the set of {0.125, 0.25, 0.5, 1, 2, 4, 6, 8, 12, 16, 20, 25, 30, 32, 35, 40, 45, 50} ms. A UE reports one combination of (N, T) values per band. The reporting of (N, T) values for the maximum bandwidth is not dependent on the subcarrier spacing (SCS). The UE is not expected to support a DL-PRS bandwidth that exceeds the reported DL-PRS bandwidth value. The UE DL-PRS processing capability is defined for a single positioning frequency layer. The UE's capability for simultaneous DL-PRS processing across positioning frequency layers is not currently supported (i.e., for a UE supporting multiple positioning frequency layers, a UE is expected to process one frequency layer at a time). The UE DL-PRS processing capability is agnostic to DL-PRS comb factor configuration. If the UE does not indicate this capability for a band or band combination, the UE does not support this positioning method in this band or band combination.

Yet another capability parameter is the maximum number of DL-PRS resources that the UE can process in a slot. For FR1 bands, this may be selected from the set of {1, 2, 4, 6, 8, 12, 16, 24, 32, 48, 64} for each SCS (e.g., 15 kHz, 30 kHz, 60 kHz). For FR2 bands, this may be selected from the set of {1, 2, 4, 6, 8, 12, 16, 24, 32, 48, 64} for each SCS (e.g., 60 kHz, 120 kHz).

Note that the above parameters are reported assuming a configured measurement gap and a maximum ratio of measurement gap length (MGL)/measurement gap repetition period (MGRP) of no more than 30%.

Yet another capability parameter is the maximum number of positioning frequency layers the UE supports across all positioning methods across all bands. This parameter may have a value selected from the set of {1, 2, 3, 4}.

Yet another capability parameter is whether the UE supports parallel processing of LTE PRS and NR PRS.

There are also capability parameters related to specific positioning techniques. For example, for DL-PRS resources for DL-AoD, a UE can indicate the maximum number of DL-PRS resource sets per TRP per frequency layer supported by the UE. This parameter can have a value selected from the set of {1, 2}. Another capability parameter for DL-AoD is the maximum number of TRPs across all positioning frequency layers per UE. This parameter can have a value selected from the set of {4, 6, 12, 16, 24, 32, 64, 128, 256}. Yet another parameter is the maximum number of positioning frequency layers the UE supports. This parameter may have a value selected from the set of {1, 2, 3, 4}.

As another example, for DL-PRS resources for DL-AoD on a band, a UE can indicate the maximum number of DL-PRS resources per DL-PRS resource set. This parameter can have a value selected from the set of {2, 4, 8, 16, 32, 64} (note that the values {16, 32, 64} are only applicable to FR2 bands). Another capability parameter is the maximum number of DL-PRS resources per positioning frequency layer. This parameter can have a value selected from the set of {6, 24, 32, 64, 96, 128, 256, 512, 1024} (note that the value {6} is only applicable to FR1 bands).

As yet another example, for DL-PRS resources for DL-AoD on a band combination, a UE can indicate the maximum number of DL-PRS resources supported by the UE across all frequency layers, TRPs, and DL-PRS resource sets for FR1 only. This parameter can have a value selected from the set of {6, 24, 64, 128, 192, 256, 512, 1024, 2048}. Another capability parameter is the maximum number of DL-PRS resources supported by the UE across all frequency layers, TRPs, and DL-PRS resource sets for FR2 only. This parameter can have a value selected from the set of {24, 64, 96, 128, 192, 256, 512, 1024, 2048}. Another capability parameter is the maximum number of DL-PRS resources supported by the UE across all frequency layers, TRPs, and DL-PRS resource sets for FR1 in FR1/FR2 mixed operation. This parameter can have a value selected from the set of {6, 24, 64, 128, 192, 256, 512, 1024, 2048}. Yet another capability parameter for DL-PRS resources for DL-AoD on a band combination is the maximum number of DL-PRS resources supported by the UE across all frequency layers, TRPs, and DL-PRS resource sets for FR2 in FR1/FR2 mixed operation. This parameter can have a value selected from the set of {24, 64, 96, 128, 192, 256, 512, 1024, 2048}.

There are also capability parameters related to uplink reference signals (e.g., SRS). For example, a UE can indicate the maximum number of pathloss estimates that the UE can simultaneously maintain for all the SRS resource sets for positioning per serving cell in addition to the up to four pathloss estimates that the UE maintains per serving cell for the PUSCH, PUCCH and/or SRS transmissions. This parameter can have a value selected from the set of {1, 4, 8, 16}. Note that "SRS transmissions" in the foregoing refers to SRS configured by the SRS-Resource parameter.

Another uplink capability parameter is the maximum number of pathloss estimates that the UE can simultaneously maintain for all the SRS resource sets for positioning across all cells in addition to the up to four pathloss estimates that the UE maintains per serving cell for the PUSCH, PUCCH and/or SRS transmissions. This parameter can have a value selected from the set of {1, 4, 8, 16}. Again, "SRS transmissions" in the foregoing refers to SRS configured by the SRS-Resource parameter.

Yet another uplink capability parameter is the maximum number of maintained spatial relations for all the SRS resource sets for positioning across all serving cells in addition to the spatial relations maintained spatial relations per serving cell for the PUSCH, PUCCH and/or SRS transmissions. This parameter can have a value selected from the set of {0,1,2,4,8,16}. Again, "SRS transmissions" in the foregoing refers to SRS configured by the SRS-Resource parameter.

With this background in mind, the present disclosure provides techniques for the interaction between a UE's PRS processing capabilities across the Uu and sidelink interfaces. That is, a UE can provide a positioning capability report (e.g., in an LPP Provide Capabilities message) that includes one or more parameters indicating joint downlink and sidelink capabilities of the UE to process both DL-PRS and SL-PRS. Note that there may still be separate sidelink-only capabilities, as is the case for the Uu capabilities described above. However, what is proposed are additional capabilities in addition to any sidelink-only capabilities. These additional capabilities may be signaled to the location server (e.g., via LPP), the serving base station (e.g., via RRC), or another sidelink UE, depending on the capability being reported.

In an aspect, a capability parameter can be defined for the maximum of the duration of DL/SL-PRS symbols 'N' (e.g., in units of ms) that the UE can process every 'T' ms, assuming a maximum PRS bandwidth (e.g., in MHz). For example, if inside 'T' ms, there are downlink slots allocated for DL-PRS and uplink slots allocated for SL-PRS on the same band, there will be a maximum number of PRS symbols that the UE can process across both sidelink and downlink resources.

In an aspect, a capability parameter can be defined for the maximum number of DL/SL PRS resources that the UE can process in a slot. For example, inside a slot, there can be both downlink symbols and uplink symbols, where the uplink symbols are used for sidelink communication. If the UE is configured to measure DL-PRS in the downlink portion and to transmit or receive SL-PRS in the uplink portion, then there should be a common maximum on the number of resource that the UE can process.

In an aspect, a capability parameter can be defined for a common DL/SL PRS buffering capability. The common DL/SL PRS buffering capability may be the Type 1 or Type 2 capability reported for downlink processing. In other words, if the UE reports Type 1 or Type 2 for downlink processing, it will also report Type 1 or Type 2 for sidelink, respectively.

In an aspect, a capability parameter can be defined for the maximum number of frequency layers the UE supports for both downlink and sidelink. In other words, the capability parameter indicating the maximum number of positioning frequency layers the UE supports across all positioning methods across all bands would include the sidelink positioning frequency layers, together with the Uu positioning frequency layers.

In an aspect, a capability parameter can be defined for the joint downlink/sidelink maximum number of PRS resources, PRS resource sets, TRPs, per band, per base station, or per UE. In other words, there can be separate feature groups (FGs) (a capability that enables the UE to report whether or not it supports a specific group of features) that provide joint maximums of the PRS resources, PRS resource sets, and/or TRPs across the SL-PRS and the DL-PRS.

In an aspect, a capability parameter can be defined for the pathloss estimate or spatial relation maintenance. As a first option, the maximum number of pathloss estimates and/or spatial relations a UE can simultaneously maintain (in addition to the legacy pathloss and/or spatial relation estimates) can include those that are derived on sidelink reference signals. As a second option, a separate maximum for the pathloss and/or spatial relation estimates can be provided in addition to the maximum that is used for Uu positioning (which is already in addition to the legacy pathloss and/or spatial relation estimates.

In an aspect, a capability parameter can be defined for a UE's ability to support parallel processing of NR DL-PRS and NR SL-PRS, or to support parallel processing of LTE PRS and NR SL-PRS. As another option, when a UE reports that it supports simultaneous NR PRS and LTE PRS, then it indicates that it also supports simultaneous SL-PRS and LTE PRS. If this feature is not supported (i.e., the UE cannot process SL-PRS and DL-PRS simultaneously), then as a first option, DL-PRS may be given a higher priority than SL-PRS, or SL-PRS may be given a lower priority than DL-PRS. As a second option, whether the UE prioritizes (and therefore processes) DL-PRS or SL-PRS may be based on the QoS requirements for each positioning method. The PRS for the positioning method with the higher QoS requirements will be given priority. As a third option, the UE may process the DL-PRS and SL-PRS on a first-come first-served basis. As a fourth option, whether the UE processes DL-PRS or SL-PRS when they overlap may be based on latency requirements, such that the type of PRS processing that needs to finish first should be processed first. As a fifth option, DL-PRS and SL-PRS may be processed in a round robin basis from the different interfaces.

Figure 11A:
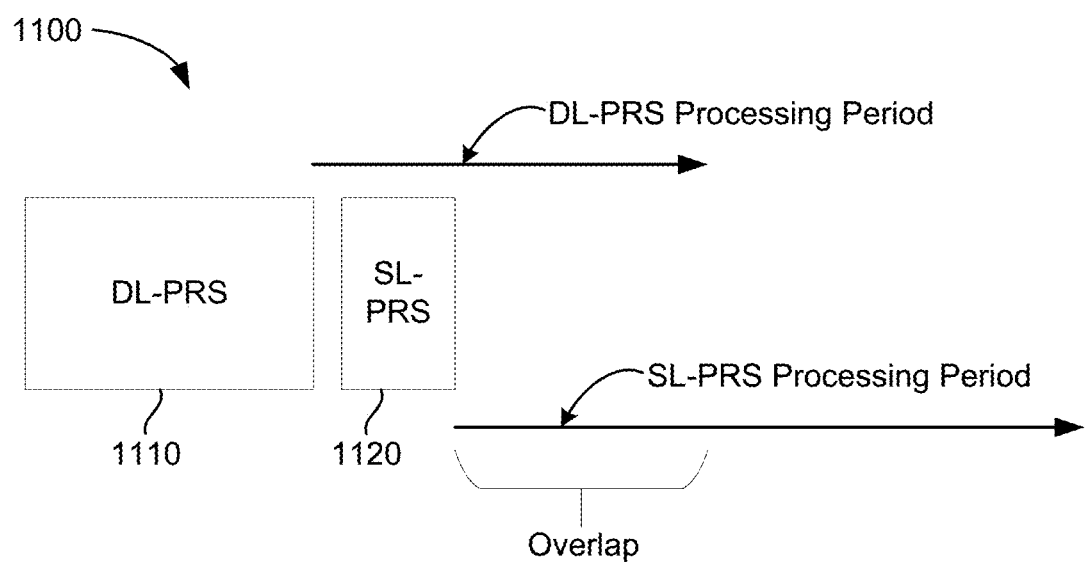
FIGS. 11A to 11C illustrate example overlap scenarios between downlink positioning reference signal (DL-PRS) and sidelink positioning reference signal (SL-PRS) processing, according to aspects of the disclosure.
Figure 11B:
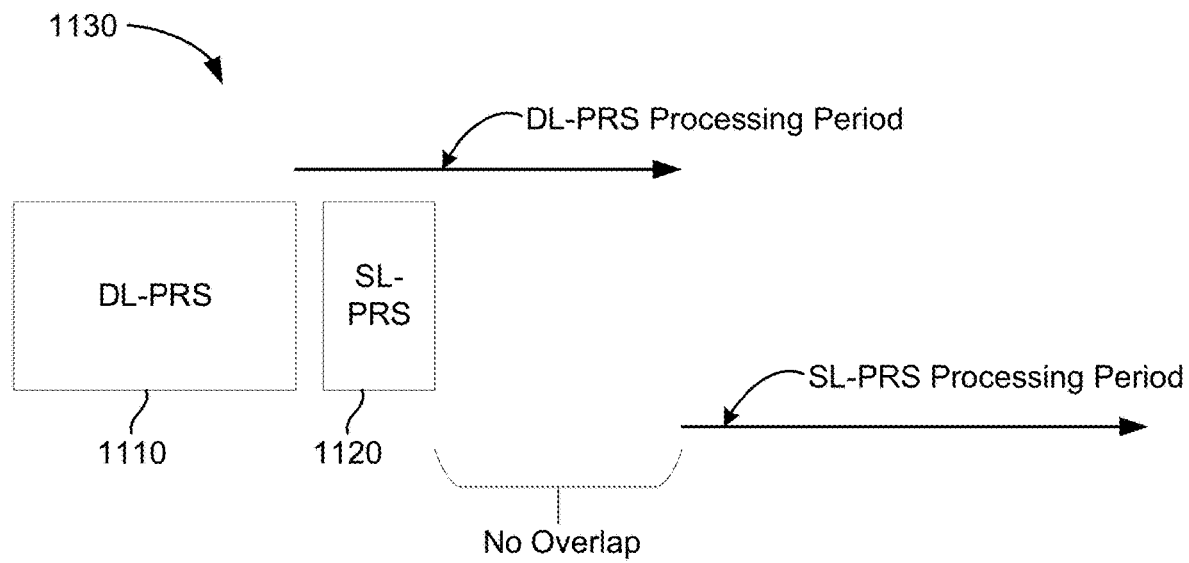
Figure 11C:
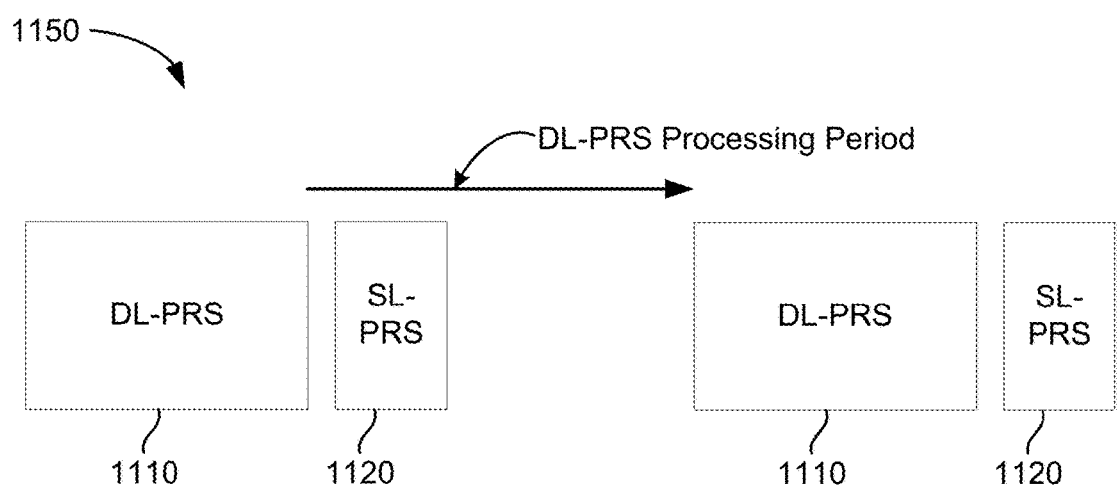

FIGS. 11A to 11C illustrate example overlap scenarios between DL-PRS and SL-PRS processing, according to aspects of the disclosure. Each of FIGS. 11A to 11C illustrate a DL-PRS instance 1110 and an SL-PRS instance 1120. Each instance may comprise one or more symbols in the time domain and one or more sub-channels in the frequency domain. Although illustrated as separated by a gap, the DL-PRS instance 1110 and the SL-PRS instance 1120 may alternatively be contiguous within a slot.

FIG. 11A is a diagram 1100 of a scenario in which the UE is capable of simultaneously processing both the DL-PRS instance 1110 and the SL-PRS instance 1120. As shown in FIG. 11A, there is an overlap between the DL-PRS processing period during which the UE processes the DL-PRS instance 1110 and the SL-PRS processing period during which the UE processes the SL-PRS instance 1120.

FIG. 11B is a diagram 1130 of a scenario in which the UE first processes the DL-PRS instance 1110 (due to the DL-PRS instance 1110 having a higher priority, being received first, being next in turn to process, etc.) while it retains in memory the received SL-PRS instance 1120. Upon finishing processing the DL-PRS instance 1110, the UE then processes the stored SL-PRS instance 1120.

FIG. 11C is a diagram 1150 of a scenario in which the UE drops the SL-PRS instance 1120 because it occurs within the DL-PRS processing period. Although FIG. 11C illustrates the UE dropping the SL-PRS instance 1120, the UE may instead drop a DL-PRS instance 1110 if it occurs within an earlier-occurring SL-PRS processing period.

Figure 12:
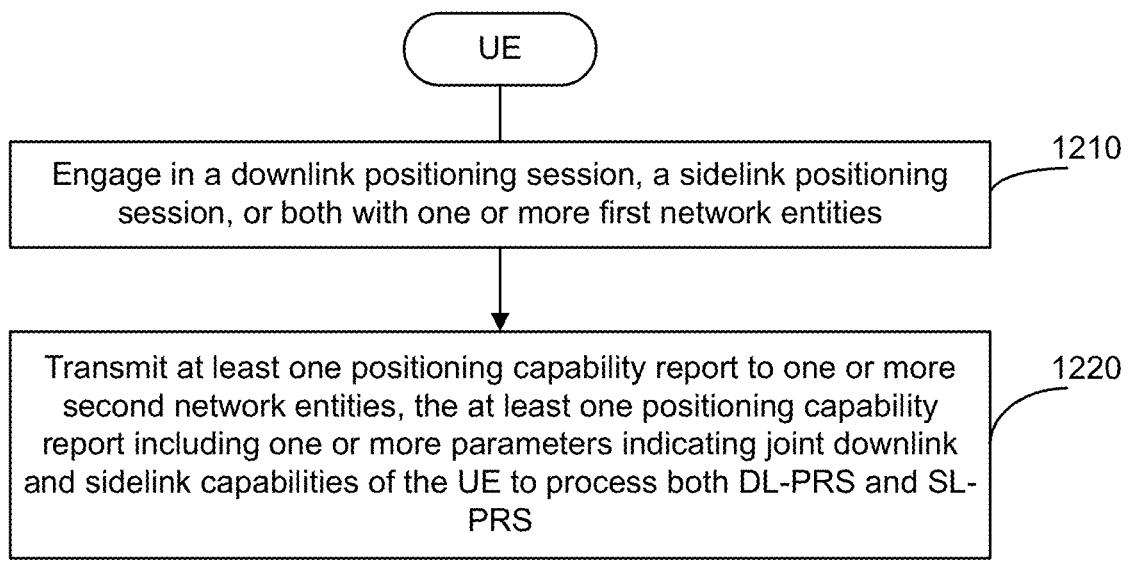
FIG. 12 illustrates an example method of wireless communication, according to aspects of the disclosure.

FIG. 12 illustrates an example method 1200 of wireless communication, according to aspects of the disclosure. In an aspect, method 1200 may be performed by a UE (e.g., any of the UEs described herein).

At 1210, the UE engages in a downlink positioning session, a sidelink positioning session, or both with one or more first network entities (e.g., a location server, one or more base stations/TRPs, one or more sidelink UEs). In an aspect, operation 1210 may be performed by the at least one WWAN transceiver 310, the at least one processor 332, memory component 340, and/or positioning component 342, any or all of which may be considered means for performing this operation.

At 1220, the UE transmits at least one positioning capability report to one or more second network entities (e.g., the location server, the base station/TRP, the other sidelink UE), the at least one positioning capability report including one or more parameters indicating joint downlink and sidelink capabilities of the UE to process both DL-PRS and SL-PRS. In an aspect, operation 1220 may be performed by the at least one WWAN transceiver 310, the at least one processor 332, memory component 340, and/or positioning component 342, any or all of which may be considered means for performing this operation.

As will be appreciated, a technical advantage of the method 1200 is enabling a UE to provide joint downlink and sidelink capabilities of the UE to process both DL-PRS and SL-PRS, thereby improving resource scheduling and utilization.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: engaging in a downlink positioning session, a sidelink positioning session, or both with one or more first network entities; and transmitting a positioning capability report to a second network entity, the positioning capability report including one or more parameters indicating joint downlink and sidelink capabilities of the UE to process both downlink positioning reference signals (DL-PRS) and sidelink positioning reference signals (SL-PRS).

Clause 2. The method of clause 1, wherein the one or more parameters include at least one parameter indicating a maximum duration N of DL-PRS symbols and SL-PRS symbols that the UE can process every T milliseconds (ms).

Clause 3: The method of clause 2, wherein the at least one parameter indicating the maximum duration N of DL-PRS symbols and SL-PRS symbols that the UE can process every T milliseconds (ms) assumes a maximum bandwidth for both DL-PRS and SL-PRS.

Clause 4. The method of clause 2, wherein the maximum duration N of DL-PRS symbols and SL-PRS symbols that the UE can process every T ms is in units of milliseconds.

Clause 5. The method of any of clauses 1 to 4, wherein the one or more parameters include at least one parameter indicating a maximum number of DL-PRS resources and SL-PRS resources that the UE can process in a group of one or more slots.

Clause 6. The method of any of clauses 1 to 5, wherein the one or more parameters include at least one parameter indicating a common buffering capability for both DL-PRS and SL-PRS.

Clause 7. The method of clause 6, wherein the common buffering capability is a Type 1 or Type 2 buffering capability.

Clause 8. The method of clause 7, wherein the at least one parameter indicates that the UE uses the Type 1 buffering capability for both DL-PRS and SL-PRS or that the UE uses the Type 2 buffering capability for both DL-PRS and SL-PRS.

Clause 9. The method of any of clauses 1 to 8, wherein the one or more parameters include at least one parameter indicating a joint downlink and sidelink maximum number of frequency layers that the UE supports.

Clause 10. The method of clause 9, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

Clause 11. The method of any of clauses 1 to 10, wherein the one or more parameters include at least one parameter indicating a joint downlink and sidelink maximum number of PRS resources, PRS resource sets, TRPs, or any combination thereof.

Clause 12. The method of clause 11, wherein the joint downlink and sidelink maximum is per band, per band combination, per band, per frequency range, or per UE.

Clause 13. The method of any of clauses 1 to 12, wherein the one or more parameters include at least one parameter indicating a joint downlink and sidelink maximum number of pathloss estimates, spatial relation estimates, or both that the UE can simultaneously maintain.

Clause 14. The method of clause 13, wherein the joint downlink and sidelink maximum includes the pathloss estimates, the spatial relation estimates, or both that the UE can derive from both downlink and sidelink reference signals.

Clause 15. The method of any of clauses 1 to 14, wherein the one or more parameters include at least one parameter indicating a downlink maximum number of pathloss estimates, spatial relation estimates, or both and a sidelink maximum number of pathloss estimates, spatial relation estimates, or both.

Clause 16. The method of any of clauses 1 to 15, wherein the one or more parameters include at least one parameter indicating a capability of the UE to support parallel processing of DL-PRS and SL-PRS.

Clause 17. The method of clause 16, wherein the DL-PRS comprise DL-PRS as defined in Fifth Generation (5G) New Radio (NR).

Clause 18. The method of clause 16, wherein the DL-PRS comprise DL-PRS as defined in Long-Term Evolution (LTE).

Clause 19. The method of any of clauses 16 to 18, wherein the at least one parameter indicating the capability of the UE to support parallel processing of DL-PRS and SL-PRS comprises at least one parameter indicating a capability of the UE to support parallel processing of DL-PRS as defined in 5G NR and DL-PRS as defined in LTE.

Clause 20. The method of any of clauses 16 to 18, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

Clause 21. The method of clause 20, wherein the UE is expected to prioritize processing DL-PRS over SL-PRS or SL-PRS over DL-PRS based on quality of service (QoS) requirements of the downlink positioning session compared to QoS requirements of the sidelink positioning session.

Clause 22. The method of any of clauses 20 to 21, wherein the UE is expected to prioritize processing DL-PRS over SL-PRS or SL-PRS over DL-PRS based on whether a DL-PRS was received before a SL-PRS or the SL-PRS was received before the DL-PRS.

Clause 23. The method of any of clauses 20 to 22, wherein the UE is expected to prioritize processing DL-PRS over SL-PRS or SL-PRS over DL-PRS based on a latency requirement of the downlink positioning session compared to a latency requirement of the sidelink positioning session.

Clause 24. The method of any of clauses 20 to 23, wherein the UE is expected to prioritize processing DL-PRS over SL-PRS or SL-PRS over DL-PRS based on round robin scheduling.

Clause 25. The method of any of clauses 16 to 24, wherein the parallel processing of DL-PRS and SL-PRS comprises processing DL-PRS and SL-PRS during at least a partially overlapping period of time.

Clause 26. The method of any of clauses 1 to 25, wherein: the second network entity is a location server, and the engaging comprises engaging in the downlink positioning session.

Clause 27. The method of any of clauses 1 to 25, wherein: the second network entity is a second UE, and the engaging comprises engaging in the sidelink positioning session.

Clause 28. The method of any of clauses 1 to 27, wherein the engaging comprises: receiving a request for the positioning capability report from the second network entity.

Clause 29. The method of any of clauses 1 to 28, wherein the one or more first network entities and the second network entity are the same network entity.

Clause 30. An apparatus comprising a memory and at least one processor communicatively coupled to the memory, the memory and the at least one processor configured to perform a method according to any of clauses 1 to 29.

Clause 31. An apparatus comprising means for performing a method according to any of clauses 1 to 29.

Clause 32. A non-transitory computer-readable medium storing computer-executable instructions, the computer-executable comprising at least one instruction for causing a computer or processor to perform a method according to any of clauses 1 to 29.

Additional implementation examples are described in the following numbered clauses:

Clause 1. A method of wireless communication performed by a user equipment (UE), comprising: engaging in a downlink positioning session, a sidelink positioning session, or both with one or more first network entities; and transmitting at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

Clause 2. The method of clause 1, wherein the one or more parameters include at least one parameter indicating a maximum duration N of DL-PRS symbols and SL-PRS symbols that the UE can process every T milliseconds (ms).

Clause 3. The method of clause 2, wherein the at least one parameter indicating the maximum duration N of DL-PRS symbols and SL-PRS symbols that the UE can process every T milliseconds (ms) assumes a maximum bandwidth for DL-PRS, SL-PRS, or both.

Clause 4. The method of any of clauses 1 to 3, wherein the one or more parameters include at least one parameter indicating a maximum number of DL-PRS resources and SL-PRS resources that the UE can process in a group of one or more slots.

Clause 5. The method of any of clauses 1 to 4, wherein the one or more parameters include at least one parameter indicating a common buffering capability for both DL-PRS and SL-PRS.

Clause 6. The method of clause 5, wherein the common buffering capability is a Type 1 or Type 2 buffering capability.

Clause 7. The method of clause 6, wherein the at least one parameter indicates that the UE uses the Type 1 buffering capability for both DL-PRS and SL-PRS or that the UE uses the Type 2 buffering capability for both DL-PRS and SL-PRS.

Clause 8. The method of any of clauses 1 to 7, wherein the one or more parameters include at least one parameter indicating a joint downlink and sidelink maximum number of frequency layers that the UE supports.

Clause 9. The method of clause 8, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

Clause 10. The method of any of clauses 1 to 9, wherein the one or more parameters include at least one parameter indicating a joint downlink and sidelink maximum number of PRS resources, PRS resource sets, TRPs, or any combination thereof.

Clause 11. The method of any of clauses 1 to 10, wherein the one or more parameters are reported per band, per band combination, per frequency range, or per UE.

Clause 12. The method of any of clauses 1 to 11, wherein the one or more parameters include at least one parameter indicating a joint downlink and sidelink maximum number of pathloss estimates, spatial relation estimates, or both that the UE can simultaneously maintain.

Clause 13. The method of clause 12, wherein the joint downlink and sidelink maximum includes the pathloss estimates, the spatial relation estimates, or both that the UE can derive from both downlink and sidelink reference signals.

Clause 14. The method of any of clauses 1 to 13, wherein the one or more parameters include at least one parameter indicating a downlink maximum number of pathloss estimates, spatial relation estimates, or both and a sidelink maximum number of pathloss estimates, spatial relation estimates, or both.

Clause 15. The method of any of clauses 1 to 14, wherein the one or more parameters include at least one parameter indicating a capability of the UE to support parallel processing of DL-PRS and SL-PRS.

Clause 16. The method of clause 15, wherein: the DL-PRS comprise DL-PRS as defined in Fifth Generation (5G) New Radio (NR), or the DL-PRS comprise DL-PRS as defined in Long-Term Evolution (LTE).

Clause 17. The method of clause 16, wherein the at least one parameter indicating the capability of the UE to support parallel processing of DL-PRS and SL-PRS comprises at least one parameter indicating a capability of the UE to support parallel processing of the DL-PRS as defined in 5G NR and the DL-PRS as defined in LTE.

Clause 18. The method of any of clauses 16 to 17, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

Clause 19. The method of clause 18, wherein the UE is expected to prioritize processing DL-PRS over SL-PRS or SL-PRS over DL-PRS based on quality of service (QoS) requirements of the downlink positioning session compared to QoS requirements of the sidelink positioning session.

Clause 20. The method of any of clauses 18 to 19, wherein the UE is expected to prioritize processing DL-PRS over SL-PRS or SL-PRS over DL-PRS based on whether a DL-PRS was received before a SL-PRS or the SL-PRS was received before the DL-PRS.

Clause 21. The method of any of clauses 18 to 20, wherein the UE is expected to prioritize processing DL-PRS over SL-PRS or SL-PRS over DL-PRS based on a latency requirement of the downlink positioning session compared to a latency requirement of the sidelink positioning session.

Clause 22. The method of any of clauses 18 to 21, wherein the UE is expected to prioritize processing DL-PRS over SL-PRS or SL-PRS over DL-PRS based on round robin scheduling.

Clause 23. The method of any of clauses 16 to 22, wherein the parallel processing of DL-PRS and SL-PRS comprises processing DL-PRS and SL-PRS during at least a partially overlapping period of time.

Clause 24. The method of any of clauses 1 to 23, wherein: the one or more second network entities are a location server, and engaging in the downlink positioning session, the sidelink positioning session, or both comprises engaging in the downlink positioning session.

Clause 25. The method of any of clauses 1 to 23, wherein: the one or more second network entities are a second UE, a location server, or both, and engaging in the downlink positioning session, the sidelink positioning session, or both comprises engaging in the sidelink positioning session.

Clause 26. The method of any of clauses 1 to 25, wherein engaging in the downlink positioning session, the sidelink positioning session, or both comprises: receiving a request for the at least one positioning capability report from the one or more second network entities.

Clause 27. The method of any of clauses 1 to 26, wherein the one or more first network entities and the one or more second network entities are the same one or more network entities.

Clause 28. A user equipment (UE), comprising: a memory; at least one transceiver; and at least one processor communicatively coupled to the memory and the at least one transceiver, the at least one processor configured to: engage in a downlink positioning session, a sidelink positioning session, or both with one or more first network entities; and transmit, via the at least one transceiver, at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

Clause 29. The UE of clause 28, wherein the one or more parameters include at least one parameter indicating a maximum duration N of DL-PRS symbols and SL-PRS symbols that the UE can process every T milliseconds (ms).

Clause 30. The UE of clause 29, wherein the at least one parameter indicating the maximum duration N of DL-PRS symbols and SL-PRS symbols that the UE can process every T milliseconds (ms) assumes a maximum bandwidth for DL-PRS, SL-PRS, or both.

Clause 31. The UE of any of clauses 28 to 30, wherein the one or more parameters include at least one parameter indicating a maximum number of DL-PRS resources and SL-PRS resources that the UE can process in a group of one or more slots.

Clause 32. The UE of any of clauses 28 to 31, wherein the one or more parameters include at least one parameter indicating a common buffering capability for both DL-PRS and SL-PRS.

Clause 33. The UE of clause 32, wherein the common buffering capability is a Type 1 or Type 2 buffering capability.

Clause 34. The UE of clause 33, wherein the at least one parameter indicates that the UE uses the Type 1 buffering capability for both DL-PRS and SL-PRS or that the UE uses the Type 2 buffering capability for both DL-PRS and SL-PRS.

Clause 35. The UE of any of clauses 28 to 34, wherein the one or more parameters include at least one parameter indicating a joint downlink and sidelink maximum number of frequency layers that the UE supports.

Clause 36. The UE of clause 35, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

Clause 37. The UE of any of clauses 28 to 36, wherein the one or more parameters include at least one parameter indicating a joint downlink and sidelink maximum number of PRS resources, PRS resource sets, TRPs, or any combination thereof.

Clause 38. The UE of any of clauses 28 to 37, wherein the one or more parameters are reported per band, per band combination, per frequency range, or per UE.

Clause 39. The UE of any of clauses 28 to 38, wherein the one or more parameters include at least one parameter indicating a joint downlink and sidelink maximum number of pathloss estimates, spatial relation estimates, or both that the UE can simultaneously maintain.

Clause 40. The UE of clause 39, wherein the joint downlink and sidelink maximum includes the pathloss estimates, the spatial relation estimates, or both that the UE can derive from both downlink and sidelink reference signals.

Clause 41. The UE of any of clauses 28 to 40, wherein the one or more parameters include at least one parameter indicating a downlink maximum number of pathloss estimates, spatial relation estimates, or both and a sidelink maximum number of pathloss estimates, spatial relation estimates, or both.

Clause 42. The UE of any of clauses 28 to 41, wherein the one or more parameters include at least one parameter indicating a capability of the UE to support parallel processing of DL-PRS and SL-PRS.

Clause 43. The UE of clause 42, wherein: the DL-PRS comprise DL-PRS as defined in Fifth Generation (5G) New Radio (NR), or the DL-PRS comprise DL-PRS as defined in Long-Term Evolution (LTE).

Clause 44. The UE of clause 43, wherein the at least one parameter indicating the capability of the UE to support parallel processing of DL-PRS and SL-PRS comprises at least one parameter indicating a capability of the UE to support parallel processing of the DL-PRS as defined in 5G NR and the DL-PRS as defined in LTE.

Clause 45. The UE of any of clauses 43 to 44, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

Clause 46. The UE of clause 45, wherein the UE is expected to prioritize processing DL-PRS over SL-PRS or SL-PRS over DL-PRS based on quality of service (QoS) requirements of the downlink positioning session compared to QoS requirements of the sidelink positioning session.

Clause 47. The UE of any of clauses 45 to 46, wherein the UE is expected to prioritize processing DL-PRS over SL-PRS or SL-PRS over DL-PRS based on whether a DL-PRS was received before a SL-PRS or the SL-PRS was received before the DL-PRS.

Clause 48. The UE of any of clauses 45 to 47, wherein the UE is expected to prioritize processing DL-PRS over SL-PRS or SL-PRS over DL-PRS based on a latency requirement of the downlink positioning session compared to a latency requirement of the sidelink positioning session.

Clause 49. The UE of any of clauses 45 to 48, wherein the UE is expected to prioritize processing DL-PRS over SL-PRS or SL-PRS over DL-PRS based on round robin scheduling.

Clause 50. The UE of any of clauses 43 to 49, wherein the parallel processing of DL-PRS and SL-PRS comprises processing DL-PRS and SL-PRS during at least a partially overlapping period of time.

Clause 51. The UE of any of clauses 28 to 50, wherein: the one or more second network entities are a location server, and the at least one processor being configured to engage in the downlink positioning session, the sidelink positioning session, or both comprises the at least one processor being configured to engage in the downlink positioning session.

Clause 52. The UE of any of clauses 28 to 50, wherein: the one or more second network entities are a second UE, a location server, or both, and the at least one processor being configured to engage in the downlink positioning session, the sidelink positioning session, or both comprises the at least one processor being configured to engage in the sidelink positioning session.

Clause 53. The UE of any of clauses 28 to 52, wherein the at least one processor configured to engage in the downlink positioning session, the sidelink positioning session, or both comprises the at least one processor configured to: receive, via the at least one transceiver, a request for the at least one positioning capability report from the one or more second network entities.

Clause 54. The UE of any of clauses 28 to 53, wherein the one or more first network entities and the one or more second network entities are the same one or more network entities.

Clause 55. A user equipment (UE), comprising: means for engaging in a downlink positioning session, a sidelink positioning session, or both with one or more first network entities; and means for transmitting at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

Clause 56. The UE of clause 55, wherein the one or more parameters include at least one parameter indicating a maximum duration N of DL-PRS symbols and SL-PRS symbols that the UE can process every T milliseconds (ms).

Clause 57. The UE of clause 56, wherein the at least one parameter indicating the maximum duration N of DL-PRS symbols and SL-PRS symbols that the UE can process every T milliseconds (ms) assumes a maximum bandwidth for DL-PRS, SL-PRS, or both.

Clause 58. The UE of any of clauses 55 to 57, wherein the one or more parameters include at least one parameter indicating a maximum number of DL-PRS resources and SL-PRS resources that the UE can process in a group of one or more slots.

Clause 59. The UE of any of clauses 55 to 58, wherein the one or more parameters include at least one parameter indicating a common buffering capability for both DL-PRS and SL-PRS.

Clause 60. The UE of clause 59, wherein the common buffering capability is a Type 1 or Type 2 buffering capability.

Clause 61. The UE of clause 60, wherein the at least one parameter indicates that the UE uses the Type 1 buffering capability for both DL-PRS and SL-PRS or that the UE uses the Type 2 buffering capability for both DL-PRS and SL-PRS.

Clause 62. The UE of any of clauses 55 to 61, wherein the one or more parameters include at least one parameter indicating a joint downlink and sidelink maximum number of frequency layers that the UE supports.

Clause 63. The UE of clause 62, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

Clause 64. The UE of any of clauses 55 to 63, wherein the one or more parameters include at least one parameter indicating a joint downlink and sidelink maximum number of PRS resources, PRS resource sets, TRPs, or any combination thereof.

Clause 65. The UE of any of clauses 55 to 64, wherein the one or more parameters are reported per band, per band combination, per frequency range, or per UE.

Clause 66. The UE of any of clauses 55 to 65, wherein the one or more parameters include at least one parameter indicating a joint downlink and sidelink maximum number of pathloss estimates, spatial relation estimates, or both that the UE can simultaneously maintain.

Clause 67. The UE of clause 66, wherein the joint downlink and sidelink maximum includes the pathloss estimates, the spatial relation estimates, or both that the UE can derive from both downlink and sidelink reference signals.

Clause 68. The UE of any of clauses 55 to 67, wherein the one or more parameters include at least one parameter indicating a downlink maximum number of pathloss estimates, spatial relation estimates, or both and a sidelink maximum number of pathloss estimates, spatial relation estimates, or both.

Clause 69. The UE of any of clauses 55 to 68, wherein the one or more parameters include at least one parameter indicating a capability of the UE to support parallel processing of DL-PRS and SL-PRS.

Clause 70. The UE of clause 69, wherein: the DL-PRS comprise DL-PRS as defined in Fifth Generation (5G) New Radio (NR), or the DL-PRS comprise DL-PRS as defined in Long-Term Evolution (LTE).

Clause 71. The UE of clause 70, wherein the at least one parameter indicating the capability of the UE to support parallel processing of DL-PRS and SL-PRS comprises at least one parameter indicating a capability of the UE to support parallel processing of the DL-PRS as defined in 5G NR and the DL-PRS as defined in LTE.

Clause 72. The UE of any of clauses 70 to 71, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

Clause 73. The UE of clause 72, wherein the UE is expected to prioritize processing DL-PRS over SL-PRS or SL-PRS over DL-PRS based on quality of service (QoS) requirements of the downlink positioning session compared to QoS requirements of the sidelink positioning session.

Clause 74. The UE of any of clauses 72 to 73, wherein the UE is expected to prioritize processing DL-PRS over SL-PRS or SL-PRS over DL-PRS based on whether a DL-PRS was received before a SL-PRS or the SL-PRS was received before the DL-PRS.

Clause 75. The UE of any of clauses 72 to 74, wherein the UE is expected to prioritize processing DL-PRS over SL-PRS or SL-PRS over DL-PRS based on a latency requirement of the downlink positioning session compared to a latency requirement of the sidelink positioning session.

Clause 76. The UE of any of clauses 72 to 75, wherein the UE is expected to prioritize processing DL-PRS over SL-PRS or SL-PRS over DL-PRS based on round robin scheduling.

Clause 77. The UE of any of clauses 70 to 76, wherein the parallel processing of DL-PRS and SL-PRS comprises processing DL-PRS and SL-PRS during at least a partially overlapping period of time.

Clause 78. The UE of any of clauses 55 to 77, wherein: the one or more second network entities are a location server, and the means for engaging in the downlink positioning session, the sidelink positioning session, or both comprises means for engaging in the downlink positioning session.

Clause 79. The UE of any of clauses 55 to 77, wherein: the one or more second network entities are a second UE, a location server, or both, and the means for engaging in the downlink positioning session, the sidelink positioning session, or both comprises means for engaging in the sidelink positioning session.

Clause 80. The UE of any of clauses 55 to 79, wherein the means for engaging in the downlink positioning session, the sidelink positioning session, or both comprises: means for receiving a request for the at least one positioning capability report from the one or more second network entities.

Clause 81. The UE of any of clauses 55 to 80, wherein the one or more first network entities and the one or more second network entities are the same one or more network entities.

Clause 82. A non-transitory computer-readable medium storing computer-executable instructions that, when executed by a user equipment (UE), cause the UE to: engage in a downlink positioning session, a sidelink positioning session, or both with one or more first network entities; and transmit at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

Clause 83. The non-transitory computer-readable medium of clause 82, wherein the one or more parameters include at least one parameter indicating a maximum duration N of DL-PRS symbols and SL-PRS symbols that the UE can process every T milliseconds (ms).

Clause 84. The non-transitory computer-readable medium of clause 83, wherein the at least one parameter indicating the maximum duration N of DL-PRS symbols and SL-PRS symbols that the UE can process every T milliseconds (ms) assumes a maximum bandwidth for DL-PRS, SL-PRS, or both.

Clause 85. The non-transitory computer-readable medium of any of clauses 82 to 84, wherein the one or more parameters include at least one parameter indicating a maximum number of DL-PRS resources and SL-PRS resources that the UE can process in a group of one or more slots.

Clause 86. The non-transitory computer-readable medium of any of clauses 82 to 85, wherein the one or more parameters include at least one parameter indicating a common buffering capability for both DL-PRS and SL-PRS.

Clause 87. The non-transitory computer-readable medium of clause 86, wherein the common buffering capability is a Type 1 or Type 2 buffering capability.

Clause 88. The non-transitory computer-readable medium of clause 87, wherein the at least one parameter indicates that the UE uses the Type 1 buffering capability for both DL-PRS and SL-PRS or that the UE uses the Type 2 buffering capability for both DL-PRS and SL-PRS.

Clause 89. The non-transitory computer-readable medium of any of clauses 82 to 88, wherein the one or more parameters include at least one parameter indicating a joint downlink and sidelink maximum number of frequency layers that the UE supports.

Clause 90. The non-transitory computer-readable medium of clause 89, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

Clause 91. The non-transitory computer-readable medium of any of clauses 82 to 90, wherein the one or more parameters include at least one parameter indicating a joint downlink and sidelink maximum number of PRS resources, PRS resource sets, TRPs, or any combination thereof.

Clause 92. The non-transitory computer-readable medium of any of clauses 82 to 91, wherein the one or more parameters are reported per band, per band combination, per frequency range, or per UE.

Clause 93. The non-transitory computer-readable medium of any of clauses 82 to 92, wherein the one or more parameters include at least one parameter indicating a joint downlink and sidelink maximum number of pathloss estimates, spatial relation estimates, or both that the UE can simultaneously maintain.

Clause 94. The non-transitory computer-readable medium of clause 93, wherein the joint downlink and sidelink maximum includes the pathloss estimates, the spatial relation estimates, or both that the UE can derive from both downlink and sidelink reference signals.

Clause 95. The non-transitory computer-readable medium of any of clauses 82 to 94, wherein the one or more parameters include at least one parameter indicating a downlink maximum number of pathloss estimates, spatial relation estimates, or both and a sidelink maximum number of pathloss estimates, spatial relation estimates, or both.

Clause 96. The non-transitory computer-readable medium of any of clauses 82 to 95, wherein the one or more parameters include at least one parameter indicating a capability of the UE to support parallel processing of DL-PRS and SL-PRS.

Clause 97. The non-transitory computer-readable medium of clause 96, wherein: the DL-PRS comprise DL-PRS as defined in Fifth Generation (5G) New Radio (NR), or the DL-PRS comprise DL-PRS as defined in Long-Term Evolution (LTE).

Clause 98. The non-transitory computer-readable medium of clause 97, wherein the at least one parameter indicating the capability of the UE to support parallel processing of DL-PRS and SL-PRS comprises at least one parameter indicating a capability of the UE to support parallel processing of the DL-PRS as defined in 5G NR and the DL-PRS as defined in LTE.

Clause 99. The non-transitory computer-readable medium of any of clauses 97 to 98, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

Clause 100. The non-transitory computer-readable medium of clause 99, wherein the UE is expected to prioritize processing DL-PRS over SL-PRS or SL-PRS over DL-PRS based on quality of service (QoS) requirements of the downlink positioning session compared to QoS requirements of the sidelink positioning session.

Clause 101. The non-transitory computer-readable medium of any of clauses 99 to 100, wherein the UE is expected to prioritize processing DL-PRS over SL-PRS or SL-PRS over DL-PRS based on whether a DL-PRS was received before a SL-PRS or the SL-PRS was received before the DL-PRS.

Clause 102. The non-transitory computer-readable medium of any of clauses 99 to 101, wherein the UE is expected to prioritize processing DL-PRS over SL-PRS or SL-PRS over DL-PRS based on a latency requirement of the downlink positioning session compared to a latency requirement of the sidelink positioning session.

Clause 103. The non-transitory computer-readable medium of any of clauses 99 to 102, wherein the UE is expected to prioritize processing DL-PRS over SL-PRS or SL-PRS over DL-PRS based on round robin scheduling.

Clause 104. The non-transitory computer-readable medium of any of clauses 97 to 103, wherein the parallel processing of DL-PRS and SL-PRS comprises processing DL-PRS and SL-PRS during at least a partially overlapping period of time.

Clause 105. The non-transitory computer-readable medium of any of clauses 82 to 104, wherein: the one or more second network entities are a location server, and the computer-executable instructions that, when executed by the UE, cause the UE to engage in the downlink positioning session, the sidelink positioning session, or both comprise computer-executable instructions that, when executed by the UE, cause the UE to engage in the downlink positioning session.

Clause 106. The non-transitory computer-readable medium of any of clauses 82 to 104, wherein: the one or more second network entities are a second UE, a location server, or both, and the computer-executable instructions that, when executed by the UE, cause the UE to engage in the downlink positioning session, the sidelink positioning session, or both comprise computer-executable instructions that, when executed by the UE, cause the UE to engage in the sidelink positioning session.

Clause 107. The non-transitory computer-readable medium of any of clauses 82 to 106, wherein the computer-executable instructions that, when executed by the UE, cause the UE to engage in the downlink positioning session, the sidelink positioning session, or both comprise computer-executable instructions that, when executed by the UE, cause the UE to: receive a request for the at least one positioning capability report from the one or more second network entities.

Clause 108. The non-transitory computer-readable medium of any of clauses 82 to 107, wherein the one or more first network entities and the one or more second network entities are the same one or more network entities.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    engaging in a downlink positioning session, a sidelink positioning session, or both with one or more first network entities; and
    transmitting at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

2. The method of claim 1, wherein the one or more parameters include at least one parameter indicating a maximum duration N of DL-PRS symbols and SL-PRS symbols that the UE can process every T milliseconds (ms).

3. The method of claim 2, wherein the at least one parameter indicating the maximum duration N of DL-PRS symbols and SL-PRS symbols that the UE can process every T milliseconds (ms) assumes a maximum bandwidth for DL-PRS, SL-PRS, or both.

4. The method of claim 1, wherein the one or more parameters include at least one parameter indicating a maximum number of DL-PRS resources and SL-PRS resources that the UE can process in a group of one or more slots.

5. The method of claim 1, wherein the one or more parameters include at least one parameter indicating a common buffering capability for both DL-PRS and SL-PRS.

6. The method of claim 5, wherein the common buffering capability is a Type 1 or Type 2 buffering capability.

7. The method of claim 6, wherein the at least one parameter indicates that the UE uses the Type 1 buffering capability for both DL-PRS and SL-PRS or that the UE uses the Type 2 buffering capability for both DL-PRS and SL-PRS.

8. The method of claim 1, wherein the one or more parameters include at least one parameter indicating a joint downlink and sidelink maximum number of frequency layers that the UE supports.

9. The method of claim 8, wherein the joint downlink and sidelink maximum is a maximum number of positioning frequency layers that the UE supports across all positioning methods across all frequency bands, and includes all sidelink positioning frequency layers and all downlink positioning frequency layers that the UE supports.

10. The method of claim 1, wherein the one or more parameters include at least one parameter indicating a joint downlink and sidelink maximum number of PRS resources, PRS resource sets, TRPs, or any combination thereof.

11. The method of claim 1, wherein the one or more parameters are reported per band, per band combination, per frequency range, or per UE.

12. The method of claim 1, wherein the one or more parameters include at least one parameter indicating a joint downlink and sidelink maximum number of pathloss estimates, spatial relation estimates, or both that the UE can simultaneously maintain.

13. The method of claim 12, wherein the joint downlink and sidelink maximum includes the pathloss estimates, the spatial relation estimates, or both that the UE can derive from both downlink and sidelink reference signals.

14. The method of claim 1, wherein the one or more parameters include at least one parameter indicating a downlink maximum number of pathloss estimates, spatial relation estimates, or both and a sidelink maximum number of pathloss estimates, spatial relation estimates, or both.

15. The method of claim 1, wherein the one or more parameters include at least one parameter indicating a capability of the UE to support parallel processing of DL-PRS and SL-PRS.

16. The method of claim 15, wherein:
the DL-PRS comprise DL-PRS as defined in Fifth Generation (5G) New Radio (NR), or
the DL-PRS comprise DL-PRS as defined in Long-Term Evolution (LTE).

17. The method of claim 16, wherein the at least one parameter indicating the capability of the UE to support parallel processing of DL-PRS and SL-PRS comprises at least one parameter indicating a capability of the UE to support parallel processing of the DL-PRS as defined in 5G NR and the DL-PRS as defined in LTE.

18. The method of claim 16, wherein, based on the at least one parameter indicating that the UE does not have the capability to support parallel processing of DL-PRS and SL-PRS, the UE is expected to prioritize processing DL-PRS over SL-PRS or SL-PRS over DL-PRS.

19. The method of claim 18, wherein the UE is expected to prioritize processing DL-PRS over SL-PRS or SL-PRS over DL-PRS based on quality of service (QoS) requirements of the downlink positioning session compared to QoS requirements of the sidelink positioning session.

20. The method of claim 18, wherein the UE is expected to prioritize processing DL-PRS over SL-PRS or SL-PRS over DL-PRS based on whether a DL-PRS was received before a SL-PRS or the SL-PRS was received before the DL-PRS.

21. The method of claim 18, wherein the UE is expected to prioritize processing DL-PRS over SL-PRS or SL-PRS over DL-PRS based on a latency requirement of the downlink positioning session compared to a latency requirement of the sidelink positioning session.

22. The method of claim 18, wherein the UE is expected to prioritize processing DL-PRS over SL-PRS or SL-PRS over DL-PRS based on round robin scheduling.

23. The method of claim 16, wherein the parallel processing of DL-PRS and SL-PRS comprises processing DL-PRS and SL-PRS during at least a partially overlapping period of time.

24. The method of claim 1, wherein:
the one or more second network entities are a location server, and
engaging in the downlink positioning session, the sidelink positioning session, or both comprises engaging in the downlink positioning session.

25. The method of claim 1, wherein:
the one or more second network entities are a second UE, a location server, or both, and
engaging in the downlink positioning session, the sidelink positioning session, or both comprises engaging in the sidelink positioning session.

26. The method of claim 1, wherein engaging in the downlink positioning session, the sidelink positioning session, or both comprises:
receiving a request for the at least one positioning capability report from the one or more second network entities.

27. The method of claim 1, wherein the one or more first network entities and the one or more second network entities are the same one or more network entities.

28. A user equipment (UE), comprising:
a memory;
a communication interface; and
at least one processor communicatively coupled to the memory and the communication interface, the at least one processor configured to:
engage in a downlink positioning session, a sidelink positioning session, or both with one or more first network entities; and
cause the communication interface to transmit at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

29. A user equipment (UE), comprising:
- means for engaging in a downlink positioning session, a sidelink positioning session, or both with one or more first network entities; and
- means for transmitting at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

30. A non-transitory computer-readable medium storing computer-executable instructions that, when executed by a user equipment (UE), cause the UE to:
- engage in a downlink positioning session, a sidelink positioning session, or both with one or more first network entities; and
- transmit at least one positioning capability report to one or more second network entities, the at least one positioning capability report including one or more parameters indicating joint downlink and sidelink capabilities of the UE to process both downlink positioning reference signals (DL-PRS) and sidelink positioning reference signals (SL-PRS).

* * * * *